(12) United States Patent
Ueda

(10) Patent No.: US 8,707,002 B2
(45) Date of Patent: Apr. 22, 2014

(54) CONTROL APPARATUS

(75) Inventor: Koichi Ueda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 700 days.

(21) Appl. No.: 12/791,404

(22) Filed: Jun. 1, 2010

(65) Prior Publication Data

US 2010/0313052 A1 Dec. 9, 2010

(30) Foreign Application Priority Data

Jun. 9, 2009 (JP) ................................. 2009-138339
Jun. 18, 2009 (JP) ................................. 2009-145821
Jun. 24, 2009 (JP) ................................. 2009-150175

(51) Int. Cl.
*G06F 12/00* (2006.01)
(52) U.S. Cl.
USPC ........... 711/167; 711/106; 713/320; 365/226; 365/227
(58) Field of Classification Search
None
See application file for complete search history.

(56) References Cited

U.S. PATENT DOCUMENTS

| 6,151,036 | A | 11/2000 | Nakajima et al. | |
|---|---|---|---|---|
| 6,523,089 | B2 * | 2/2003 | Tsern et al. | 711/118 |
| 7,065,263 | B2 | 6/2006 | Ueda | |
| 7,286,720 | B2 | 10/2007 | Ueda | |
| 7,386,691 | B2 * | 6/2008 | Berens et al. | 711/157 |
| 7,755,951 | B2 | 7/2010 | Suzuki et al. | |
| 2003/0061458 | A1 * | 3/2003 | Wilcox et al. | 711/167 |

FOREIGN PATENT DOCUMENTS

| JP | 9-180438 A | 7/1997 |
|---|---|---|
| JP | 2009-064360 A | 3/2009 |

OTHER PUBLICATIONS

Japanese Office Action dated Sep. 13, 2013 in Japanese Patent Application No. 2009-145821.

* cited by examiner

*Primary Examiner* — Matthew Bradley
*Assistant Examiner* — Alan Otto
(74) *Attorney, Agent, or Firm* — Fitzpatrick, Cella, Harper & Scinto

(57) ABSTRACT

This invention improves the access efficiency of each of a plurality of memory devices mounted on a semiconductor chip. The invention provides a memory control circuit including a queue buffer unit, a management unit to set the CKE signal at High for a memory device to which a determination target access command is to be issued when it is determined that the determination target access command has shifted to the head position of the queue buffer unit, a command generating unit to issue an access command, and a data interface unit to execute processing specified by an access command. The management unit performs control to set the CKE signal to Low for the memory device to which the determination target access command is to be issued based on the state of the queue buffer unit when it is determined that the processing by the data interface unit is complete.

16 Claims, 16 Drawing Sheets

F I G. 6
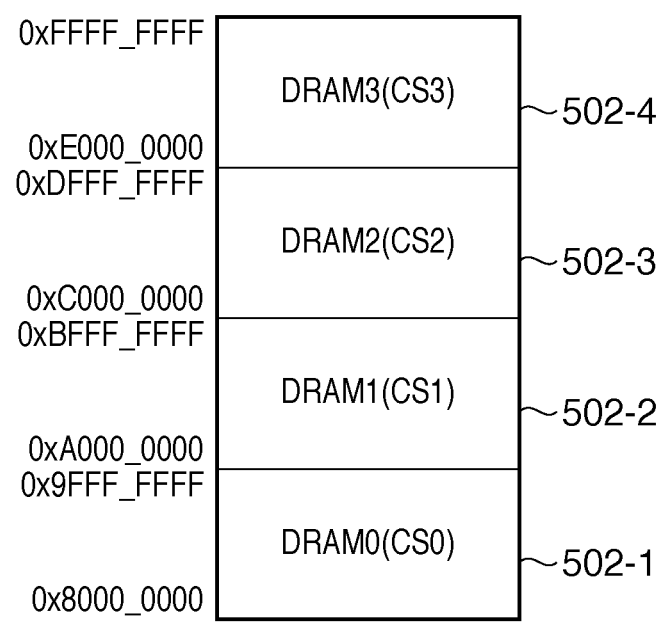

| en | empty | cs | cs0 | cs1 | cs2 | cs3 |
|----|-------|------|-----|-----|-----|-----|
| 0  | x     | "xx" | 0   | 0   | 0   | 0   |
| 1  | 0     | "xx" | 0   | 0   | 0   | 0   |
| 1  | 1     | "00" | 1   | 0   | 0   | 0   |
| 1  | 1     | "01" | 0   | 1   | 0   | 0   |
| 1  | 1     | "10" | 0   | 0   | 1   | 0   |
| 1  | 1     | "11" | 0   | 0   | 0   | 1   |

F I G. 17
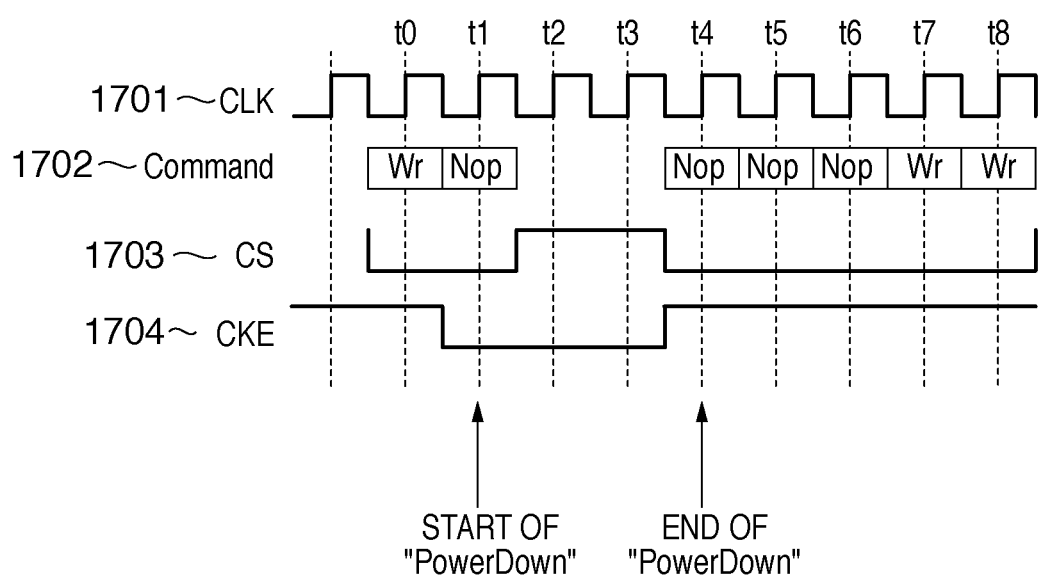

CONTROL APPARATUS

BACKGROUND OF THE INVENTION

1. Field of the Invention

The present invention relates to a control technique for controlling a plurality of memory devices.

2. Description of the Related Art

Recently, in the field of LSIs, a generally practiced design technique is a technique called SOC (System On a Chip) of integrating necessary functions (systems) on one semiconductor chip.

In a semiconductor chip designed by SOC, many fast large-capacity memory devices are generally mounted on the semiconductor chip to allow concurrent processing of each functional block (Intellectual Property) mounted on the chip. More specifically, many memory devices mounted on the chip include SDRAMs, DDRs, SDRAMs, and DDR2SDRAMs.

A reduction in power consumption is an important challenge for a semiconductor chip on which many memory devices are mounted in the above manner. Various proposals have been made to this end.

For example, Japanese Patent Laid-Open No. 9-180438 discloses a control method of reducing power consumption by setting a memory device in a low power consumption state such as a self-refresh mode or a power-down mode.

According to Japanese Patent Laid-Open No. 9-180438, however, a plurality of memory devices mounted on a semiconductor chip are configured to be controlled collectively. This makes it impossible to obtain a sufficient effect in terms of reducing power consumption in a semiconductor chip on which many memory devices like those described above which can be independently accessed using chip select (CS) signals are mounted.

For this reason, when many memory devices are mounted on a chip, Nop (No operation) commands are generally used to individually switch devices between a low power consumption mode and a normal mode. More specifically, controlling the Low/High level of a CKE (clock enable) signal accompanying the issuance of a Nop command allows to switch each memory device between the low power consumption mode and the normal mode.

FIG. 17 shows a simplified timing chart for a case in which a Nop command is used to switch each memory device between the low power consumption mode and the normal mode. Switching between the low power consumption mode and the normal mode will be briefly described below with reference to FIG. 17.

Referring to FIG. 17, reference numeral 1701 denotes a clock (CLK) signal; 1702, access command; 1703, a chip select (CS) signal; and 1704, a clock enable (CKE) signal.

In the case of FIG. 17, the CS signal 1703 is first set to Low to activate the memory device, and a write command Wr is then issued to write the corresponding write data in the memory device. Issuing a Nop command after the transmission of the write command Wr will make the memory device start "PowerDown" to shift to the low power consumption mode.

More specifically, upon issuance of a Nop command, the CKE signal 1704 is set to Low to make the memory device start "PowerDown" at a first leading edge timing t1 of the CLK signal 1701 thereafter to shift to the low power consumption mode.

Note that setting the CS signal 1703 at High after the issuance of a Nop command 1711 will inactivate the memory device. The inactive state continues until the next access command is issued.

In this case, when the next write command is to be issued, it is necessary to make the memory device end "PowerDown" to shift to the normal mode in advance. That is, it is necessary to set the CKE signal 1704 at High a predetermined number of clocks before the timing of issuing the next write command.

For this purpose, the CS signal 1703 is set to Low again at a timing t3 to activate the memory device, and a Nop command is issued while the CKE signal 1704 is set to High. The memory device ends "PowerDown" at a first leading edge timing t4 of the CLK signal 1701 after the CKE signal 1704 is set to High. The memory device then shifts to the normal mode.

Subsequently, issuing a write command will write corresponding write data in the memory device.

In this manner, in a memory device configured to control switching between the low power consumption mode and the normal mode by using a Nop command, switching is performed by activating the memory device using a CS signal and issuing a Nop command.

When a plurality of memory devices are mounted on a chip, therefore, a Nop command is issued to each memory device which switches between the low power consumption mode and the normal mode.

FIG. 18 is a timing chart for a case of switching between the low power consumption mode and the normal mode of each of four memory devices (first to fourth memory devices) mounted on a semiconductor chip.

Referring to FIG. 18, reference symbols CS0 and CKE0 denote a CS signal and a CKE signal for the first memory device, respectively; and CS1 to CS3 and CKE1 to CKE3, CS signals and CKE signals for the second to fourth memory devices, respectively.

In the case of FIG. 18, after the CS signals are set to Low, write commands are sequentially issued to the first to fourth memory devices. In this case, issuing Nop commands before and after the issuance of write commands will implement low power consumption mode/normal mode switching.

More specifically, the first memory device performs the write processing of write data from t2 to t6. Thereafter, the memory device starts "PowerDown" at a timing t10. The memory device is set in the low power consumption mode until the end of "PowerDown" at a timing t21.

Likewise, in the second to fourth memory devices, the write processing of write data and low power consumption mode/normal mode switching are performed for the respective memory devices at different timings.

As indicated by the timing chart of FIG. 18, however, switching between the low power consumption mode and the normal mode for each memory device by using a Nop command will inevitably degrade the access efficiency of each memory device.

This is because it is necessary to issue a Nop command when issuing a "PowerDown" start/end command to each of a plurality of memory devices mounted on a chip. That is, the issuance of a Nop command will delay the timing of the issuance of an access command such as a write command.

As described above, when each memory device is configured to switch between the low power consumption mode and the normal mode by using a Nop command, the access efficiency degrades as the switching frequency increases (the reduction of power consumption increases).

SUMMARY OF THE INVENTION

The present invention has been made in consideration of the above problem.

A control apparatus which is connected to a plurality of memory devices and controls operation of the plurality of memory devices based on an access request, the apparatus comprising: a queue buffer configured to hold a plurality of access requests in an issuance order; an issuing unit configured to issue a command in accordance with an access request selected from a plurality of access requests held in the queue buffer; a management unit configured to activate a memory device, of the plurality of memory devices, which is a target for an access request held in an area ranging from a head position to a predetermined position in the queue buffer; and a processing unit configured to execute, for the memory device as the target for the access request, processing to be executed for the memory device activated by the management unit based on the access request, wherein when determining that the processing unit has executed the processing to be executed based on the access request, the management unit inactivates the memory device for which the processing to be executed has been executed based on the access request.

According to the present invention, it is possible to improve the access efficiency of each of a plurality of memory devices mounted on a semiconductor chip while reducing the power consumption of each memory device.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view showing an example of a memory map for identifying memory devices 502-1 to 502-4 on a semiconductor chip 501 including the memory control circuit 100;

FIG. 17 is a timing chart showing an example of the operation of a memory device when low power consumption mode/normal mode switching of the memory device is performed by using a Nop command.

DESCRIPTION OF THE EMBODIMENTS

Embodiments of the present invention will now be described in detail in accordance with the accompanying drawings.

<1. Arrangement of Memory Control Circuit>

Figure 1:
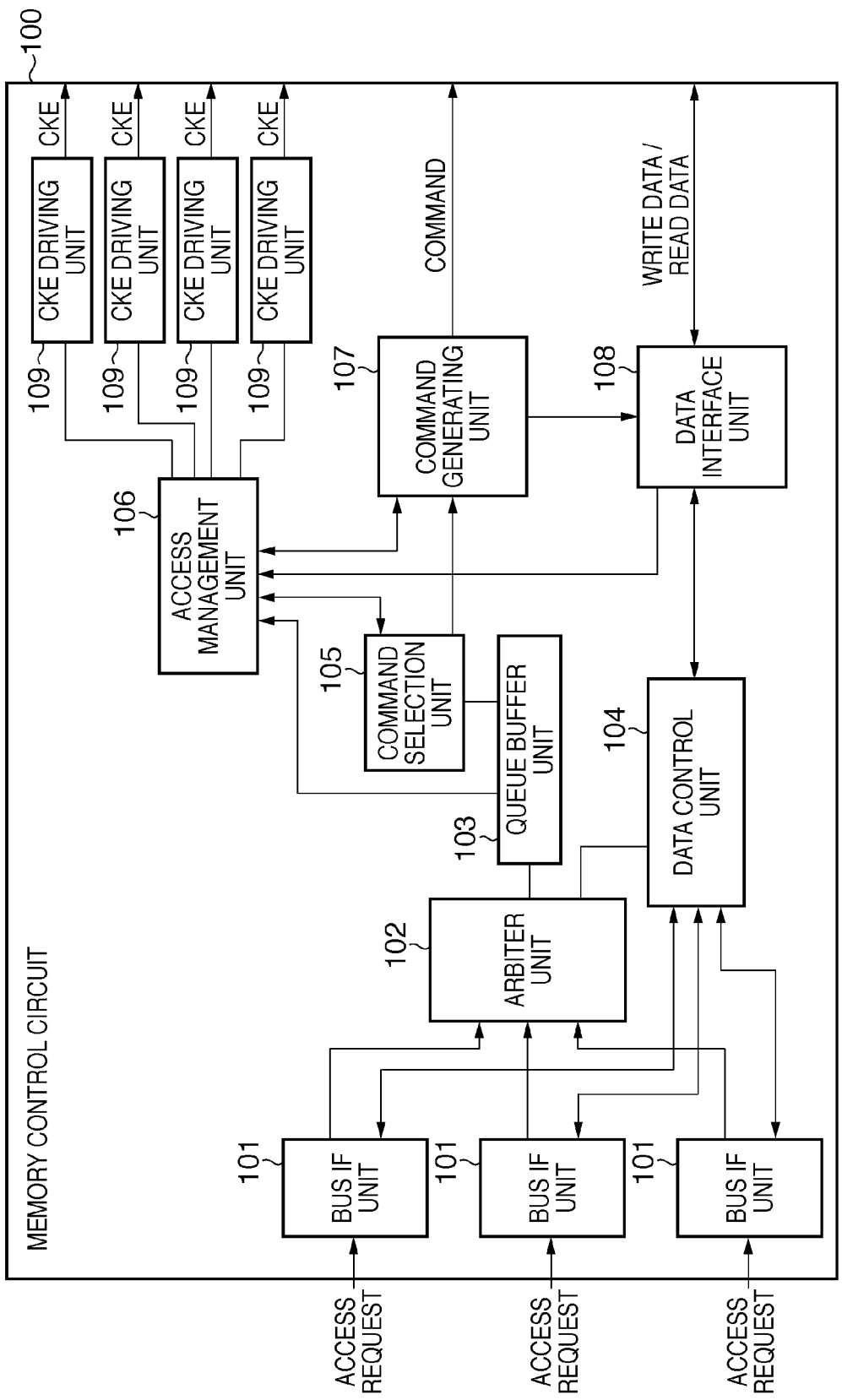
FIG. 1 is a block diagram showing the arrangement of a memory control circuit 100 according to an exemplary embodiment of the present invention.

FIG. 1 is a block diagram showing the arrangement of a memory control circuit (control apparatus) according to an exemplary embodiment of the present invention. A memory control circuit 100 is a circuit which is connected to a plurality of memory devices mounted on a semiconductor chip and is configured to control the operation of each memory device based on an external access request.

Referring to FIG. 1, reference numeral 101 denotes bus interface units connected, via buses, to master modules that issue access requests to memory devices mounted on the semiconductor chip. In the case of FIG. 1, three bus interface units are arranged to be connected to master modules via three buses of the same type or different types.

Reference numeral 102 denotes an arbiter unit which arbitrates and sequences access commands corresponding to access requests to memory devices, which the bus interface unit 101 has received; and 103, a queue buffer unit which temporarily holds the access commands sequenced by the arbiter unit 102.

Reference numeral 104 denotes a data control unit. If the access command selected by the arbiter unit 102 is a write command for a request to write data in a memory device, the data control unit 104 acquires write data from the bus interface unit 101. The data control unit 104 holds the acquired write data until a write timing. If the access command is a read command for a request to read out data from a memory device, the data control unit 104 outputs the data read out from the memory device to the bus interface unit 101 which has issued the read command.

Reference numeral 105 denotes a command selection unit which sequentially extracts access commands held in the queue buffer unit 103.

Reference numeral 106 denotes an access management unit. The access management unit 106 is connected to the queue buffer unit 103 to identify an access command held in the queue buffer unit 103 and a memory device to which the access command is to be issued. The access management unit 106 is also connected to a command generating unit 107 to manage the Low (active)/High (inactive) state of a chip select signal input to each memory device and instruct the command generating unit 107 to issue an access command. In addition, the access management unit 106 instructs a CKE driving unit 109 to set a clock enable signal to Low (inactive)/High (active).

The command generating unit 107 issues the access command selected by the command selection unit 105 to the memory device based on an instruction from the access management unit 106. When issuing a command, the command generating unit 107 controls the Low/High level of a corresponding chip select (CS) signal.

Reference numeral 108 denotes a data interface unit which outputs write data to a memory device or reads out read data from the memory device in accordance with the access command issued by the command generating unit 107.

The CKE driving unit 109 controls the Low/High level of a clock enable (CKE) signal for each memory device based on an instruction from the access management unit 106.

<2. Operation of Memory Control Circuit>

The operation of the memory control circuit 100 will be described next with reference to FIG. 1.

Referring to FIG. 1, when the memory control circuit 100 receives an access request to a memory device from a master module (not shown) via the bus interface unit 101, the bus interface unit 101 transfers, to the arbiter unit 102, information indicating that an access command has been input in response to the access request.

Upon receiving the information indicating that the access command has been input, the arbiter unit 102 arbitrates access commands from a plurality of bus interface units 101, sequentially accepts the access commands one by one, and sequentially outputs the accepted access commands to the queue buffer unit 103. This makes the queue buffer unit 103 hold the access commands in the order in which they are output from the arbiter unit 102.

If the accepted access command is an access command (write command) for a request to write data, the memory control circuit 100 simultaneously outputs a signal indicating that the command is an access command for requesting the data control unit 104 to write data. Based on this signal, the data control unit 104 acquires and holds necessary write data from the corresponding bus interface unit 101.

On the other hand, the command selection unit 105 extracts an access command held in the queue buffer unit 103 and outputs the command to the command generating unit 107. The command generating unit 107 issues a necessary access command to the memory device based on an instruction from the access management unit 106.

If the access command issued at this time is a write command, the memory control circuit 100 instructs the data interface unit 108 to start outputting write data at a predetermined data output timing. On the other hand, if the access command to be issued is a read command, the memory control circuit 100 designates the read timing of read data with respect to the data interface unit 108, and outputs, to the data interface unit 108, a signal for discriminating a master module to which the readout read data should be returned.

The access management unit 106 manages the access command selected by the command selection unit 105, the memory device to which the command generating unit 107 is to issue the access command, the state of this memory device, and the memory device for which the data interface unit 108 is performing data write/read processing.

The access management unit 106 also manages the memory device to which the access command held in the queue buffer unit 103 is to be issued (the memory device to which the access command is scheduled to be issued afterward).

Based on these pieces of information, the access management unit 106 determines the presence/absence of an access to each memory device, and executes control processing for issuing proper instructions to the command generating unit 107 and the CKE driving unit 109 based on the determination result. The details of a technique for determining the presence/absence of an access to each memory device and the details of control processing in the access management unit 106 will be described later.

<3. Technique for Determining Presence/Absence of Access to Each Memory Device in Access Management Unit>

Figure 2:
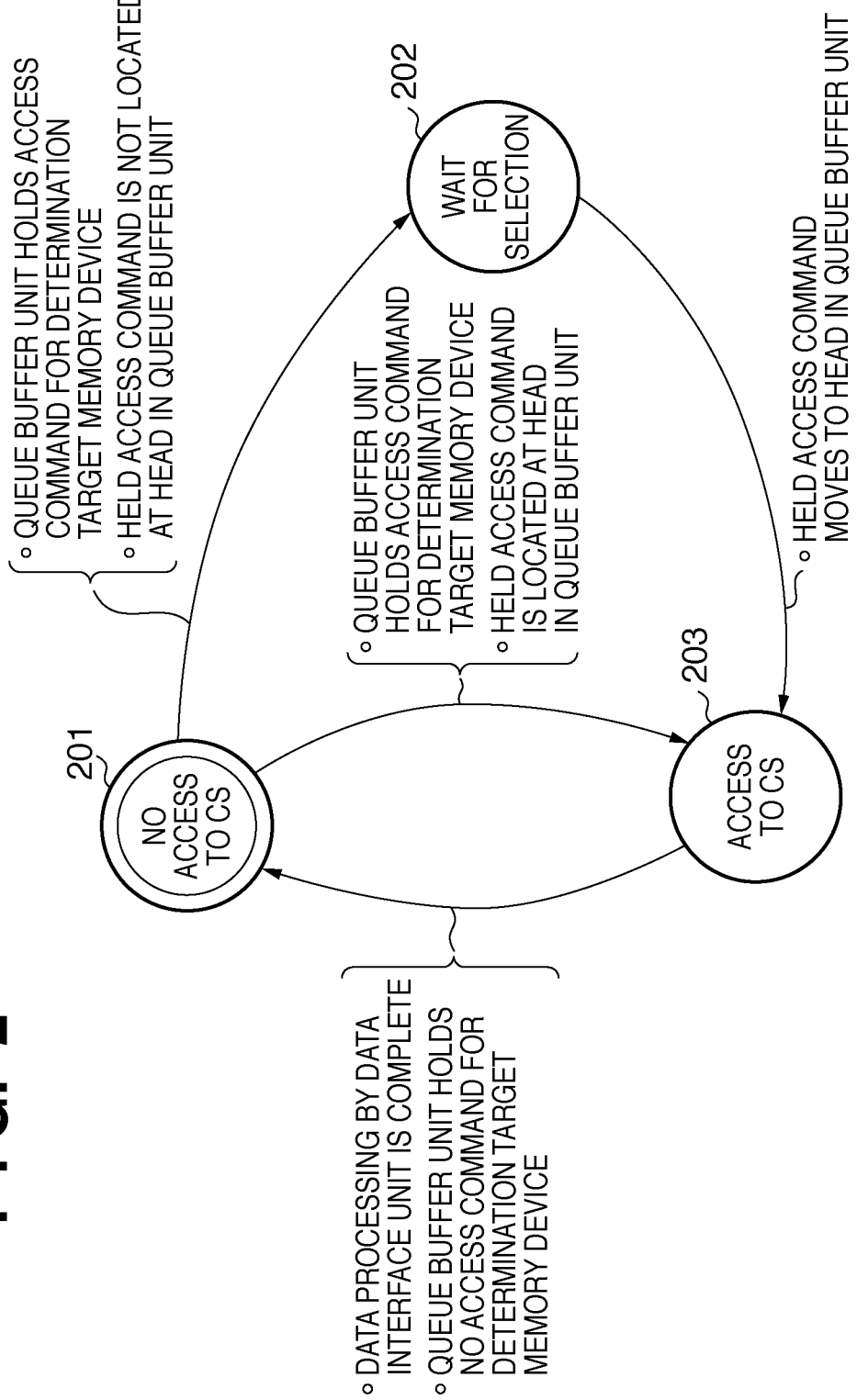
FIG. 2 is a view showing an example of the determination result obtained by an access management unit 106 which determines the presence/absence of an access to a determination target memory device.

A technique for determining the presence/absence of an access to each memory device in the access management unit 106 will be described next. FIG. 2 shows an example of the determination technique for allowing the access management unit 106 to determine the presence/absence of an access to each memory device.

Referring to FIG. 2, reference numeral 201 denotes a state (initial state) without any access request to a determination target memory device; 202, a state (selection wait state) in which there is an access request to a determination target memory device, but no access has been made to the memory device; and 203, a state in which there is an access request to a determination target memory device, and an access has been made to the memory device. Conditions for transition to the respective states will be described below.

A transition is made to the state 202 in the following case. That is, the queue buffer unit 103 is holding an access command to be issued to a determination target memory device, and the access command is not held at the head position in the queue buffer unit 103.

A transition is made to the state 203 in the following case. That is, the queue buffer unit 103 is holding an access command to be issued to a determination target memory device, and the access command is held at the head position in the queue buffer unit 103.

Assume that a transition is made to the state 202. In this case, when the access command to be issued to a determination target memory device has moved to the head position in the queue buffer unit 103, a transition is made to the state 203.

The state 203 is a state in which an access is being made to a determination target memory device. The following are conditions for transition from the state 203 to the state 201:

The data interface unit 108 has completed the write processing of write data or read processing of read data, and the queue buffer unit 103 holds no access command to be issued to the determination target memory device.

The access management unit 106 determines the presence/absence of an access to a determination target memory device based on the above determination technique.

<4. Control Processing Procedure by Access Management Unit 106>

Upon determining the presence/absence of an access to each memory device based on the above determination technique, the access management unit 106 controls the respective units based on the determination result.

Figure 3:
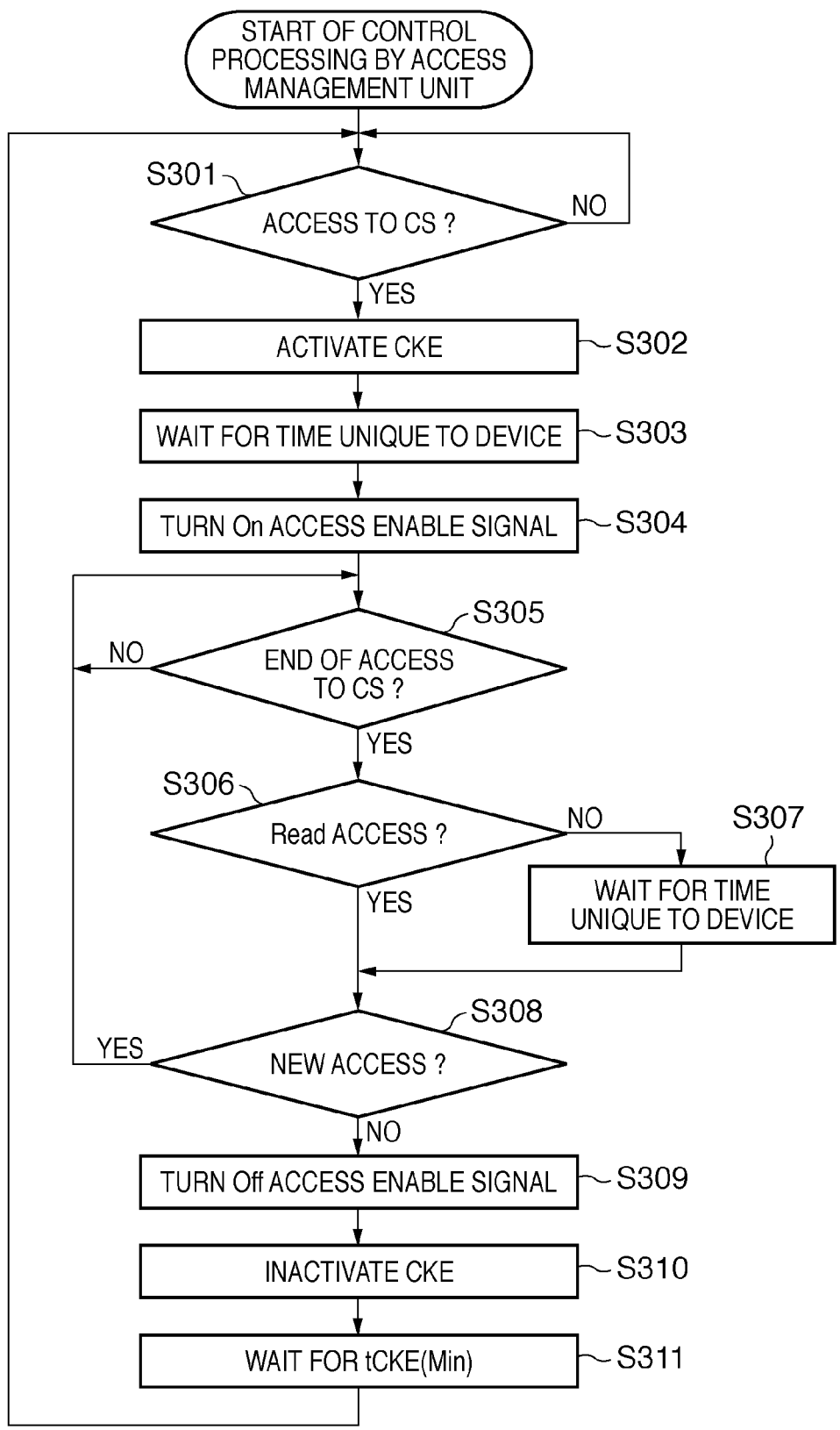
FIG. 3 is a flowchart showing a control processing procedure by the access management unit 106.

FIG. 3 is a flowchart showing a control processing procedure by the access management unit 106.

In step S301, the access management unit 106 determines the presence/absence of an access to a determination target memory device based on the determination technique shown in FIG. 2. If the access management unit 106 determines in step S301 that there is no access, the process waits in this state. If the access management unit 106 determines in step S301 that there is an access, the process advances to step S302 to instruct the CKE driving unit 109 to set the CKE signal at High.

After setting the CKE signal at High in step S302, the access management unit 106 waits in step S303 for a time corresponding to the minimum number of clocks (tCKE)

determined for each memory device in the mode set at the time of device initialization. Thereafter, in step S304, the access management unit 106 outputs, to the command generating unit 107, a signal to permit access to the determination target memory device. This makes the command generating unit 107 set the CS signal for the determination target memory device to Low and issue an access command to the memory device. In addition, the access management unit 106 issues a write instruction for write data or a read instruction for read data to the data interface unit 108. The data interface unit 108 then performs the write processing of the write data or the read processing of the read data.

In step S305, the access management unit 106 determines whether the command generating unit 107 has issued an access command. If the access management unit 106 determines in step S305 that the command generating unit 107 has issued an access command, the process advances to step S306.

In step S306, the access management unit 106 determines whether the access command issued by the command generating unit 107 is a write command or a read command. If the access management unit 106 determines in step S306 that the command is a write command, the process advances to step S307 to wait for a time corresponding to the number of clocks equivalent to the wait time (tWTR or tWR) unique to the memory device. The process then advances to step S308.

If the access management unit 106 determines in step S306 that the command is a read command, the process immediately advances to step S308.

In step S308, the access management unit 106 determines the presence/absence of a new access to the determination target memory device. Note that the manner of determining the presence/absence of an access is the same as in step S301.

If the access management unit 106 determines in step S308 that there is a new access to the determination target memory device, the process returns to step S305 while keeping the CKE signal at High. The command generating unit 107 then issues an access command based on the new access, and the process waits until the data interface unit 108 completes write processing or read processing.

If the access management unit 106 determines in step S308 that there is no new access, the process advances to step S309 to turn off the signal permitting access to the determination target memory device, which has been output to the command generating unit 107. In step S310, the access management unit 106 instructs the CKE driving unit 109 to set the CKE signal to Low. After the CKE driving unit 109 sets the CKE signal to Low, the process waits in step S311 for a time corresponding to the minimum number of clocks (tCKE) determined in advance for each memory device. The process then returns to step S301 to determine the presence/absence of a next access.

<5. Circuit Arrangement of CKE Driving Unit>

Figure 4:
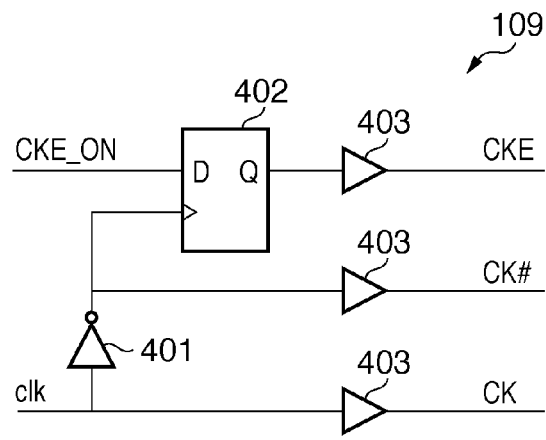
FIG. 4 is a circuit diagram showing a concrete circuit example of a CKE driving unit 109.

The circuit arrangement of the CKE driving unit 109 controlled by the access management unit 106 will be described next. FIG. 4 is a circuit diagram showing a concrete example of the circuit of the CKE driving unit 109 which generates the CKE signal based on an instruction from the access management unit 106 and actually supplies the signal to a memory device.

FIG. 4 also shows output buffers for the CK and CK# signals to facilitate the understanding of the phase relationship between clocks (CK, its logically inverted signal CK#, and CKE) actually supplied to the memory device.

Referring to FIG. 4, reference numeral 401 denotes a DFF; 402, an inverter circuit; and 403, an IO buffer which outputs a signal outside the CKE driving unit 109.

<6. Example of Connection of Memory Control Circuit>

An example of the connection between the memory control circuit 100 and memory devices on a semiconductor chip will be described next.

Figure 5:
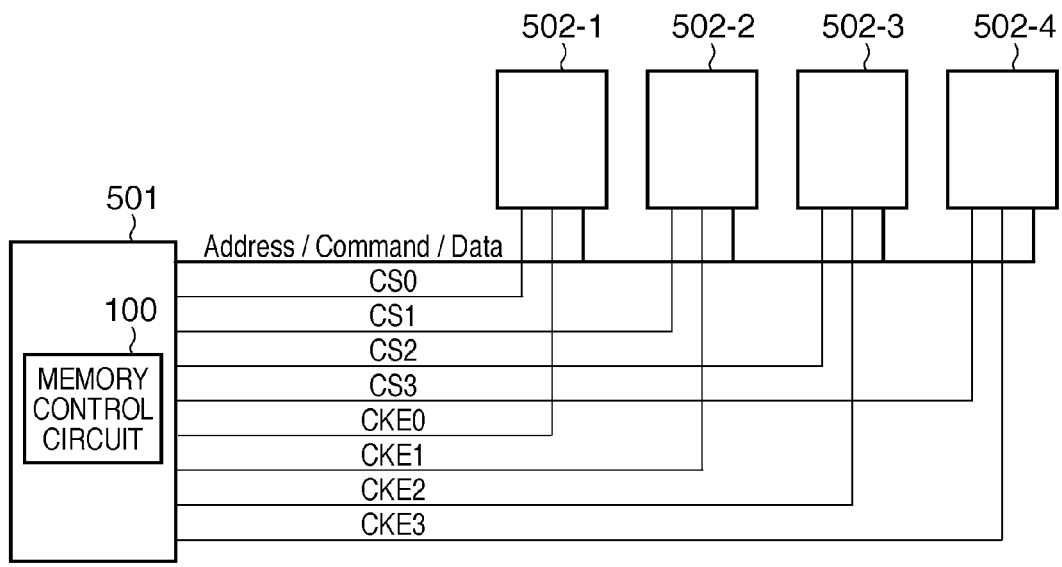
FIG. 5 is a view showing an example of connection between the memory control circuit 100 and memory devices.

FIG. 5 is a view showing an example of the connection between the memory control circuit 100 and memory devices. Referring to FIG. 5, reference numeral 501 denotes a semiconductor chip including the memory control circuit 100; and 502-1 to 502-4, memory devices or memory device units. The connection example of FIG. 5 shows a case in which four memory devices are connected to the memory control circuit 100. As shown in FIG. 5, the memory control circuit 100 is configured to input independent chip select (CS0 to CS3) signals and clock enable (CKE0 to CKE3) signals to a plurality of memory devices (or memory device units), respectively.

<7. Arrangement of Memory Devices>

The arrangement of the memory devices 502-1 to 502-4 will be described next. FIG. 6 is a view showing an example of a memory map for identifying the memory devices 502-1 to 502-4 on the semiconductor chip 501 including the memory control circuit 100.

As shown in FIG. 6, the memory devices 502-1 to 502-4 are implemented by DRAMs, and are activated when corresponding CS0 to CS3 signals are set to Low.

The memory devices 502-1 to 502-4 are respectively assigned with addresses 0x8000_0000 to 0xFFFF_FFFF. The data interface unit 108 performs the write processing of write data at a predetermined position or read processing of read data from a predetermined position based on the address.

<8. Example of Operation of Memory Control Circuit 100>

Figure 7:
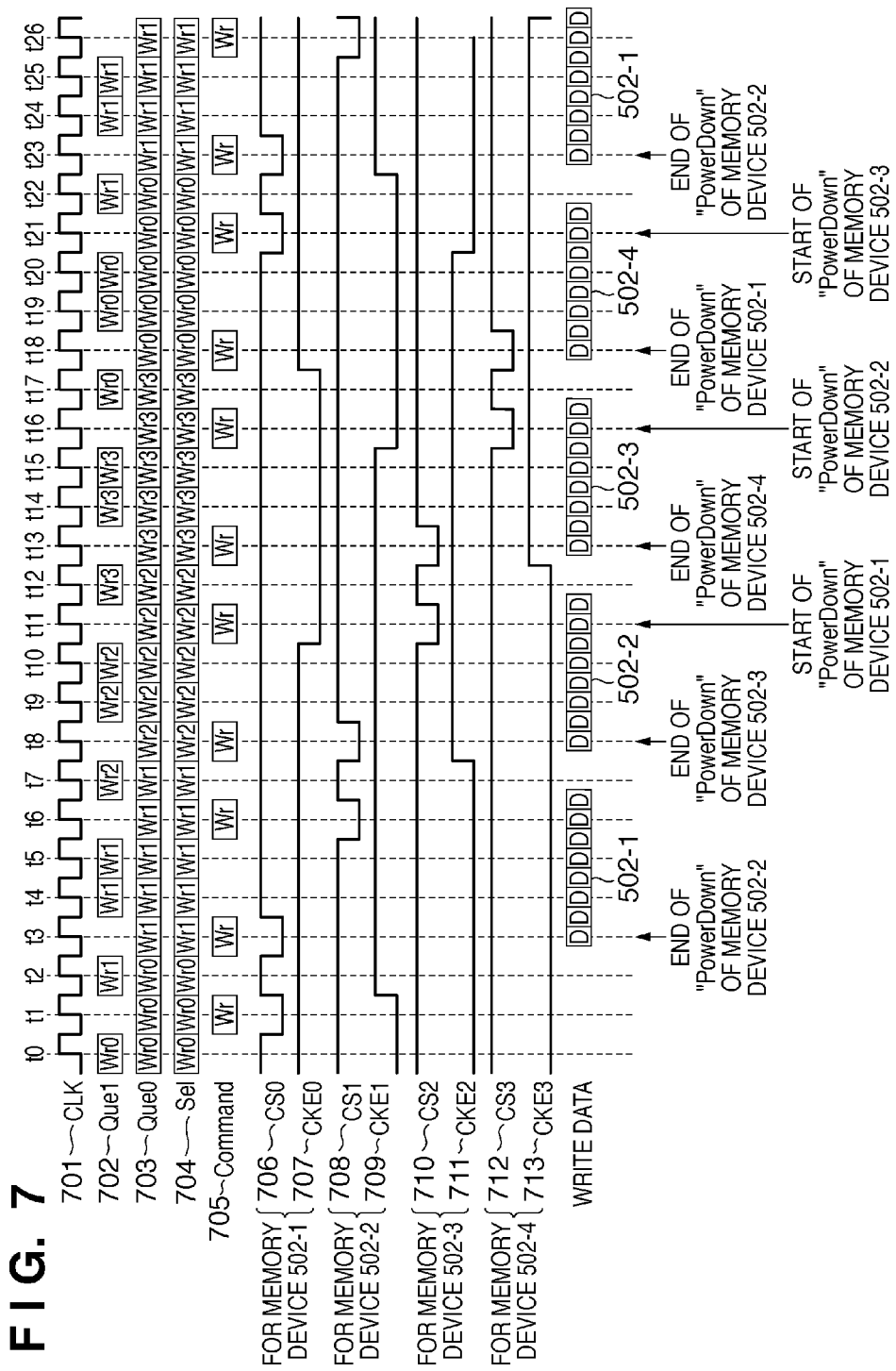
FIG. 7 is a timing chart showing an example of the operation of the memory control circuit 100.

An example of the operation of the memory control circuit 100 in a case in which access requests are issued to the respective memory devices in the connection example shown in FIG. 5 will be described next. FIG. 7 is a timing chart showing an example of the operation of the memory control circuit 100 in a case in which access requests are issued to the respective memory devices in the connection example shown in FIG. 5.

Referring to FIG. 7, reference numeral 701 denotes a clock (CLK) signal; 703 and 702, first (queue 0) and second (queue 1) write commands held in the queue buffer unit 103, respectively; 704, the access command selected by the command selection unit 105; and 705, the access command issued by the command generating unit 107.

Reference numerals 706, 708, 710, and 712 denote chip select (CS) signals for the memory devices 502-1 to 502-4; and 707, 709, 711, and 713, respectively, clock enable (CKE) signals for the memory devices 502-1 to 502-4, respectively.

An example of the operation to be performed when access requests are sequentially issued to issue instructions to write data in the memory devices 502-1 to 502-4 will be described below with reference to FIG. 7.

As shown in FIG. 7, at a timing t0, the queue buffer unit 103 has held a first write command Wr0 and a second write command Wr0 (see 702 and 703), and the command selection unit 105 has selected the write command Wr0 in queue 0 (see 704).

In this case, first of all, to perform the write processing of write data in the memory device 502-1, the memory control circuit 100 sets the CS0 signal 703 to Low at the trailing edge timing t0 to activate the memory device 502-1. The data interface unit 108 then writes the corresponding write data in the memory device 502-1 in accordance with the issuance of a write command Wr by the command generating unit 107.

Assume that a write command has a length of eight beats, and the memory control circuit 100 divides the write command into commands each having a length of four beats and consecutively outputs them (issues the second write command Wr at a trailing edge timing t2).

When the command generating unit 107 issues one write command Wr at the trailing edge timing t0, the access commands held in the queue buffer unit 103 are shifted. As a result, the write command Wr0 in queue 1 moves to queue 0, and queue 1 becomes empty. At a trailing edge timing t1, a next write command Wr1 is input to empty queue 1.

To perform the second write processing of write data in the memory device 502-1, the memory control circuit 100 sets the CS0 signal 703 to Low at the trailing edge timing t2 to activate the memory device 502-1. The data interface unit 108 then writes the corresponding write data in the memory device 502-1 in accordance with the issuance of the write command Wr (second write command) by the command generating unit 107.

When the command generating unit 107 issues one write command Wr at the trailing edge timing t2, the access commands held in the queue buffer unit 103 are shifted. As a result, the write command Wr1 (first write command Wr1) in queue 1 moves to queue 0, and queue 1 becomes empty. At a trailing edge timing t3, the next write command Wr1 (second write command) is input to empty queue 1.

The access management unit 106 determines that the write command Wr1 for the memory device 502-2 is held in queue 0 at the trailing edge timing t2, and controls the memory device 502-2 to return from the low power consumption mode to the normal mode. More specifically, the access management unit 106 sets the CKE1 signal 709 at High at the trailing edge timing t2.

At the trailing edge timing t3, the write command Wr1 (second write command Wr1) is input to queue 1 which has become empty at the trailing edge timing t2. Note that in the memory control circuit 100, the write command Wr1 is held in queue 0 of the queue buffer unit 103, the command selection unit 105 selects the write command Wr1, and queue 1 keeps holding the write command Wr1 up to t5.

When the time unique to the device has elapsed since the CKE1 signal 709 was set at High at the trailing edge timing t2, the memory control circuit 100 sets the CS1 signal 708 to Low at a trailing edge timing t5 to activate the memory device 502-2 in order to perform the write processing of write data in the memory device 502-2. The data interface unit 108 then writes the corresponding write data in the memory device 502-2 in accordance with the issuance of the write command Wr by the command generating unit 107.

To perform the second write processing of write data in the memory device 502-2, the memory control circuit 100 sets the CS1 signal 708 to Low at a trailing edge timing t7 to activate the memory device 502-2. The data interface unit 108 then writes the corresponding write data in the memory device 502-2 in accordance with the issuance of the write command Wr (second write command) by the command generating unit 107.

When the command generating unit 107 issues the write command Wr (first write command) at the trailing edge timing t5, the access commands held in the queue buffer unit 103 are shifted. As a result, the write command Wr1 (second write command) in queue 1 moves to queue 0, and queue 1 becomes empty. At a trailing edge timing t6, the write command Wr2 (first write command) is input to empty queue 1.

The access management unit 106 determines that the write command Wr2 for the memory device 502-3 is held in queue 0 at the trailing edge timing t7, and controls the memory device 502-3 to return from the low power consumption mode. More specifically, the access management unit 106 sets the CKE2 signal 711 at High at the trailing edge timing t7.

The memory control circuit 100 keeps, up to t10, the state in which the write command Wr2 is held in queue 0 of the queue buffer unit 103, the command selection unit 105 has selected the write command Wr2, and the write command Wr2 (second write command) is held in queue 2.

When the time unique to the device has elapsed since the CKE2 signal 711 was set at High at the trailing edge timing t7, the memory control circuit 100 sets the CS2 signal 710 to Low at a timing t10 to activate the memory device 502-3 in order to perform the write processing of write data in the memory device 502-3. The data interface unit 108 then writes the corresponding write data in the memory device 502-3 in accordance with the issuance of the write command Wr by the command generating unit 107.

When the command generating unit 107 issues the write command Wr (first write command) at the timing t10, the access commands held in the queue buffer unit 103 are shifted. As a result, the write command Wr2 in queue 1 moves to queue 0, and queue 1 becomes empty. At a trailing edge timing t11, a write command Wr3 is input to empty queue 1.

To perform the second write processing of write data in the memory device 502-2, the memory control circuit 100 sets the CS2 signal 710 to Low at a timing t12 to activate the memory device 502-3. The data interface unit 108 then writes the corresponding write data in the memory device 502-3 in accordance with the issuance of the write command Wr (second write command) by the command generating unit 107.

Subsequently, repeating the same processing will execute write processing for memory devices.

As described above, in the memory control circuit 100 according to this exemplary embodiment, the access management unit 106 monitors the access commands held in the queue buffer unit 103. When an access command is shifted to queue 0, the access management unit 106 determines that there is an access, and sets the CKE signal at High for the memory device to which the access command is to be issued.

When the write processing of write data in the memory device is complete, the memory control circuit 100 waits for the elapse of the time unique to the device. If the queue buffer unit 103 has held no access command to be issued to the memory device when the time unique to the device has elapsed, the memory control circuit 100 sets the CKE signal for the memory device to Low.

More specifically, when the write processing of write data in the memory device 502-1 is complete at the trailing edge timing t6, the memory control circuit 100 sets the CKE0 signal to Low after the elapse of a time corresponding to a predetermined number of clocks (the number of clocks defined by tWTR) (at the trailing edge timing t10). With this operation, the memory device 502-1 starts "PowerDown" and shifts to the low power consumption mode at the leading edge timing of the first clock (the leading edge timing t11) after the CKE0 signal is set to Low.

Likewise, when the write processing of write data in the memory device 502-2 is complete at the trialing edge timing t11, the memory control circuit 100 sets the CKE1 signal 709 to Low after the elapse of a time corresponding to a predetermined number of clocks (the number of clocks defined by tWRT) (at a trailing edge timing t15). With this operation, the memory device 502-2 starts "PowerDown" and shifts to the low power consumption mode at the leading edge timing of the first clock signal (at a leading edge timing t16) after the CKE1 signal 709 is set to Low.

As is obvious from the above description, when the issuance of a write command to a predetermined memory device is complete and a write command is to be issued to the next memory device, the memory control circuit 100 sets the CKE signal at High for the memory device to which the next write command is to be issued when recognizing that queue 0 of the queue buffer unit 103 holds the next write command.

With this operation, when the memory control circuit 100 issues a write command to the memory device, the memory device will have ended "PowerDown" and returned from the low power consumption mode to the normal mode.

As a consequence, it is possible to concurrently perform the write processing of write data in a predetermined memory device and issue a write command to the next memory device.

When completing the write processing of write data in a predetermined memory device, the memory control circuit 100 sets the CKE signal for the predetermined memory device to Low after a period of time elapses that corresponds to the number of clocks defined by tWTR.

With this operation, the predetermined memory device starts "PowerDown" and shifts from the normal mode to the low power consumption mode.

As a consequence, it is possible to concurrently make a predetermined memory device shift to the low power consumption mode and issue a write command to the next memory device.

That is, since the number of access codes issued is smaller than that when low power consumption mode/normal mode switching is performed by using Nop commands as in the prior art, it is possible to improve the access efficiency of memory devices.

This makes it possible to improve the access efficiency of each of a plurality of memory devices mounted on a semiconductor chip while reducing the power consumption of each memory device.

The above operation example has been described assuming that all device accesses have been hit by using the so-called open page mode of memory devices. However, the present invention is not limited to this assumption, and can be equally applied to a case in which the so-called close page mode of memory devices is used. Another exemplary embodiment using the close page mode of memory devices will be described below with reference to FIGS. 8 and 9.

<1. Control Processing Procedure by Access Management Unit 106>

Figure 8:
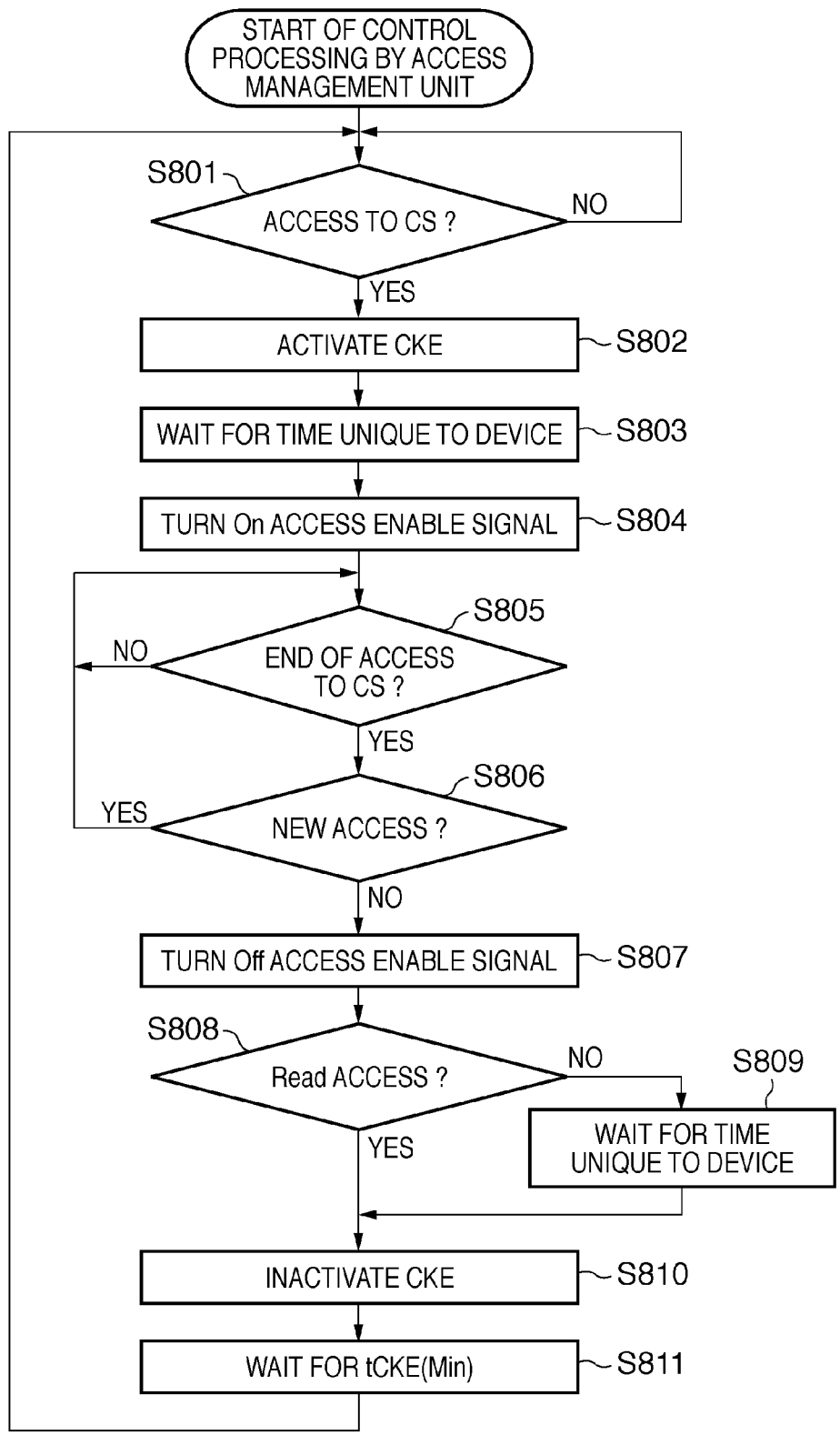
FIG. 8 is a flowchart showing a control processing procedure by the access management unit 106 according to another exemplary embodiment of the present invention.

FIG. 8 is a flowchart showing a control processing procedure by an access management unit 106.

In step S801, the access management unit 106 determines the presence/absence of an access to a determination target memory device based on the determination technique shown in FIG. 2. If the access management unit 106 determines in step S801 that there is no access, the process waits in this state. If the access management unit 106 determines in step S801 that there is an access, the process advances to step S802 to instruct a CKE driving unit 109 to set the CKE signal at High.

After setting the CKE signal at High in step S802, the access management unit 106 waits for a time corresponding to the minimum number of clocks (tCKE) determined in advance for each memory device in the mode set at the time of deviation initialization in step S803. In step S804, the access management unit 106 then outputs, to a command generating unit 107, a signal for permitting access to the determination target memory device. This makes the command generating unit 107 set the CS signal for the determination target memory device to Low and issue a command (activate (ACT) command and access command) to the memory device. In addition, the access management unit 106 issues a write instruction for write data or a read instruction for read data to a data interface unit 108. The data interface unit 108 then performs the write processing of write data or read processing of read data.

In step S805, the access management unit 106 determines whether the command generating unit 107 has completely issued an ACT command and an access command. If the access management unit 106 determines in step S805 that the issuance of commands is complete, the process advances to step S806 to determine the presence/absence of a new access to the determination target memory device. Note that the presence/absence of an access is determined in the same manner as in step S801.

If the access management unit 106 determines in step S806 that there is a new access to the determination target memory device, the process returns to step S805 while keeping the CKE signal at High. The command generating unit 107 then issues an access command based on the new access, and waits until the data interface unit 108 completes write processing or read processing (in this case, no ACT command is issued).

If the access management unit 106 determines in step S806 that there is no new access, the process advances to step S807 to turn off the signal permitting access to the determination target memory device, which has been output to the command generating unit 107.

In step S808, the access management unit 106 checks whether the access command issued by the command generating unit 107 is a write command or a read command. If the access management unit 106 determines in step S808 that the command is a write command, the process advances to step S809 to wait for a time corresponding to the number of clocks equivalent to the wait time (tWTR or tWR) unique to the memory device. The process then advances to step S810.

If the access management unit 106 determines in step S808 that the command is a read command, the process immediately advances to step S810.

In step S810, the access management unit 106 instructs the CKE driving unit 109 to set the CKE signal to Low. In addition, after setting the CKE signal to Low, the process waits in step S811 for a time corresponding to the minimum number of clocks equivalent to tCKE determined in advance for each memory device. The process then returns to step S801 to determine the presence/absence of a next access.

<2. Example of Operation of Memory Control Circuit 100>

Figure 9:
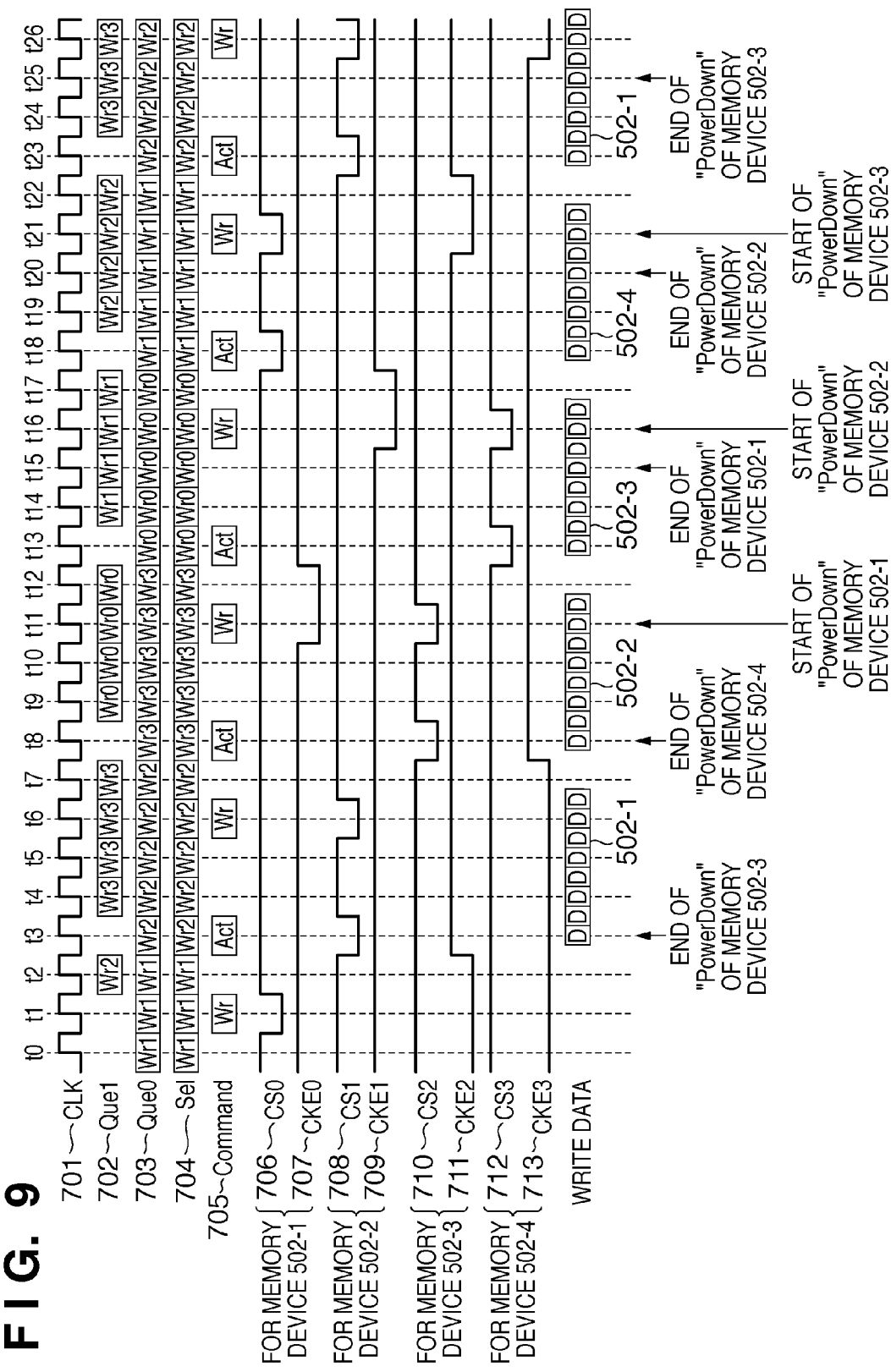
FIG. 9 is a timing chart showing an example of the operation of the memory control circuit 100.

FIG. 9 is a timing chart showing an example of the operation of a memory control circuit 100 in a case in which memory devices are used in the close page mode. The basic prerequisites in this timing chart are the same as those in the timing chart shown in FIG. 7 except that tWR=3 and a write command is output as an access command having a length of eight beats without any change.

As shown in FIG. 9, upon determining that the write command Wr2 for a memory device 502-3 is held in queue 0 at a trailing edge timing t2, the access management unit 106 controls the memory device 502-3 to return from the low power consumption mode. More specifically, the access management unit 106 sets a CKE2 signal 711 at High at the trailing edge timing t2. With this operation, the memory device 502-3 ends the "PowerDown" state at a leading edge timing t3.

When the time unique to the device has elapsed (at a trailing edge timing t7) since the CKE2 signal 711 was set at High at the trailing edge timing t2, the command generating unit 107 issues an activate command (ACT) to open the designated bank address and row address in the memory device 502-3. When a time corresponding to a predetermined number of clocks (the number of clocks defined by CL) has elapsed (at a trailing edge timing t10), the command generating unit 107 issues the write command Wr.

Assume that the write command issued at this time is a Write with Auto Precharge command (WrA) which can automatically close a page upon completion of the write processing of write data.

When the write processing of write data in the memory device 502-3 is complete at a timing t16, the memory control circuit 100 sets the CKE0 signal to Low after the elapse of a time corresponding to a predetermined number of clocks (the number of clocks defined by tWR) (t20). With this operation, the memory device 502-3 starts "PowerDown" at a leading edge timing t21, and shifts to the low power consumption mode.

In order to issue a write command to a memory device 502-4 concurrently with the write processing of write data in the memory device 502-3, the access management unit 106 controls the memory device 502-4 to return from the low power consumption mode, when determining that a write command Wr3 for the memory device 502-4 is held in queue 0 at the trailing edge timing t7. More specifically, the access management unit 106 sets a CKE3 signal 713 at High at the trailing edge timing t7. With this operation the memory device 502-4 ends the "PowerDown" state at a leading edge timing t8.

When the time unique to the device has elapsed (at a trailing edge timing t12) since the CKE3 signal 713 was set at High at the trailing edge timing t7, the command generating unit 107 issues an activate command (ACT) to open the designated bank address and row address in the memory device 502-4. In addition, when a time corresponding to a predetermined number of clocks (the number of clocks defined by CL) has elapsed (at a trailing edge timing t15), the command generating unit 107 issues the write command Wr.

In this manner, in the memory control circuit 100 according to this exemplary embodiment, the access management unit 106 monitors the access commands held in a queue buffer unit 103. When an access command is shifted to queue 0, the access management unit 106 sets the CKE signal at High for the memory device to which the access command is to be issued, and issues an activate command to open a predetermined bank address and row address in the memory device.

When the write processing of write data in the memory device is complete, the memory control circuit 100 waits until the elapse of the time unique to the device. When the time unique to the device has elapsed, the memory control circuit 100 sets the CKE signal to Low if no access command to be issued to the memory device is held in the queue buffer unit 103.

More specifically, when a time corresponding to a predetermined number of clocks (the number of clocks defined by tWR) has elapsed (at a timing t20) since the completion of the write processing of write data in the memory device 502-3 at the timing t16, the memory control circuit 100 sets the CKE2 signal to Low. With this operation, the memory device 502-3 starts "PowerDown" at the timing t21 and shifts to the low power consumption mode.

Likewise, when a time corresponding to a predetermined number of clocks (the number of clocks defined by tWR) has elapsed (at a timing t25) since the completion of the write processing of write data in the memory device 502-4 at the timing t21, the memory control circuit 100 sets the CKE3 signal to Low. With this operation, the memory device 502-4 starts "PowerDown" and shifts to the low power consumption mode.

As is obvious from the above description, when the issuance of a write command to a predetermined memory device is complete and a write command is to be issued to the next memory device, the memory control circuit 100 sets the CKE signal at High for the memory device to which the next write command is to be issued when recognizing that queue 0 of the queue buffer unit 103 holds the next write command.

With this operation, when the memory control circuit 100 issues an access command to the memory device, the memory device will have ended "PowerDown" and returned from the low power consumption mode to the normal mode.

The memory control circuit 100 then issues an activate command to open a predetermined bank address and row address in the memory device, and issues a write command.

With this processing, it is possible to concurrently perform the write processing of write data in a predetermined memory device and issue an ACT command and a write command for the next memory device.

When a time corresponding to the number of clocks defined by tWR has elapsed since the completion of the write processing of write data in a predetermined memory device, the memory control circuit 100 sets the CKE signal for the predetermined memory device to Low.

With this operation, the predetermined memory device starts "PowerDown" and shifts from the normal mode to the low power consumption mode.

With this processing, it is possible to concurrently shift the predetermined memory device to the low power consumption mode and issue a write command to the next memory device.

As a consequence, since the number of commands issued is smaller than that when the low power consumption mode and the normal mode are switched by using Nop commands as in the prior art, it is possible to improve the access efficiency of memory devices.

According to the above exemplary embodiment, as shown in FIG. 3, only when determining in step S308 that there is no new access, the access management unit 106 sets the CKE signal to Low. However, the present invention is not limited to this. For example, the present invention may be configured to set the CKE signal to Low in the following case. That is, the memory control circuit 100 determines that there is no access and the process waits for selection, and the issuance timing of an access command corresponding to the access is after a predetermined period of time or more.

The present invention may be configured to perform different types of power-down processing depending on when the memory control circuit 100 determines that there is no access and when the memory control circuit 100 determines that there is no access but a selection wait state is set and the issuance timing of an access command corresponding to the access is after a predetermined period of time or more. More specifically, upon determining that there is no access, the memory control circuit 100 issues a precharge all command, and then sets the CKE signal to Low. Assume that the memory control circuit 100 determines that there is no access, a selection wait state is set, and the issuance timing of an access command corresponding to the access is after a predetermined period of time or more. In this case, the memory control circuit 100 may perform control to set the CKE signal to Low without issuing any precharge all command.

<1. Control Processing Procedure by Access Management Unit 106>

Figure 10:
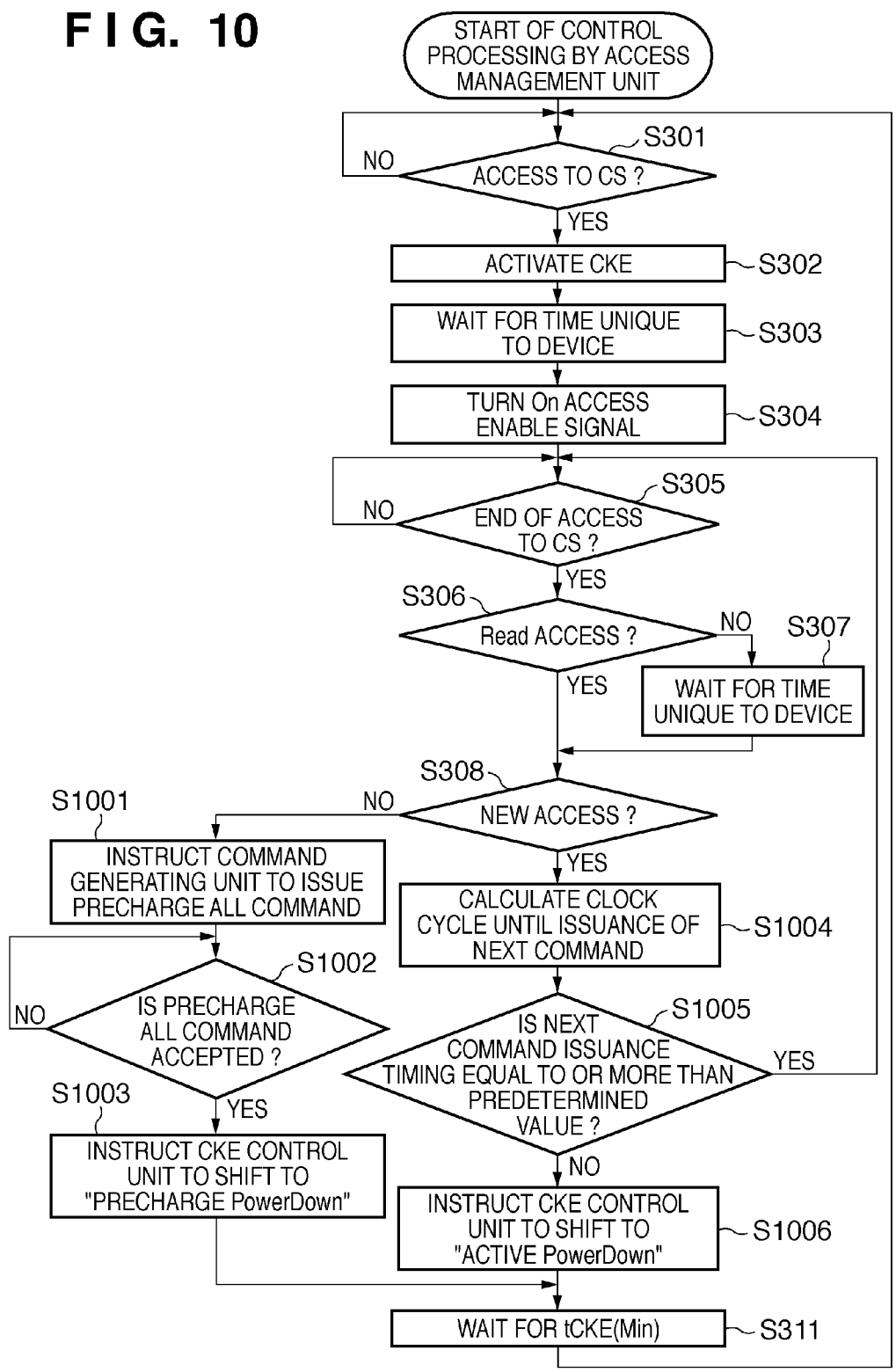
FIG. 10 is a flowchart showing a control processing procedure by the access management unit 106.

FIG. 10 is a flowchart showing a control processing procedure by a access management unit 106. Since the processing in steps S301 to S307 and step S311 is the same as that in steps S301 to S307 and S311 in FIG. 3, a description of the processing will be omitted.

In step S308, the access management unit 106 determines the presence/absence of an access to a determination target memory device. Note that Note that the presence/absence of an access is determined in the same manner as in step S301.

If the access management unit 106 determines in step S308 that there is no new access, the process advances to step S1001 to instruct a command generating unit 107 to issue a precharge all command.

The access management unit 106 determines in step S1002 whether the determination target memory device has accepted the precharge command issued by the command generating unit 107 based on the instruction in step S1001.

If the access management unit 106 determines in step S1002 that the memory device has accepted the precharge command, the process advances to step S1003 to instruct a CKE driving unit 109 to set the CKE signal to Low.

If the access management unit 106 determines in step S308 that there is a new access to a determination target memory device, the process advances to step S1004 to calculate a clock cycle until the command generating unit 107 issues the access command.

In step S1005, the access management unit 106 determines whether the clock cycle calculated in step S1004 is equal to or more than a predetermined value. If the access management unit 106 determines in step S1005 that the clock cycle is equal to or more than the predetermined value, the process advances to step S1006 to instruct the CKE driving unit 109 to set the CKE signal to Low.

If the access management unit 106 determines in step S1005 that the clock cycle is less than the predetermined value, the process returns to step S305 to wait until the command generating unit 107 issues an access command based on the new access and a data interface unit 108 completes write processing or read processing.

<2. Example of Operation of Memory Control Circuit 100>

Figure 11:
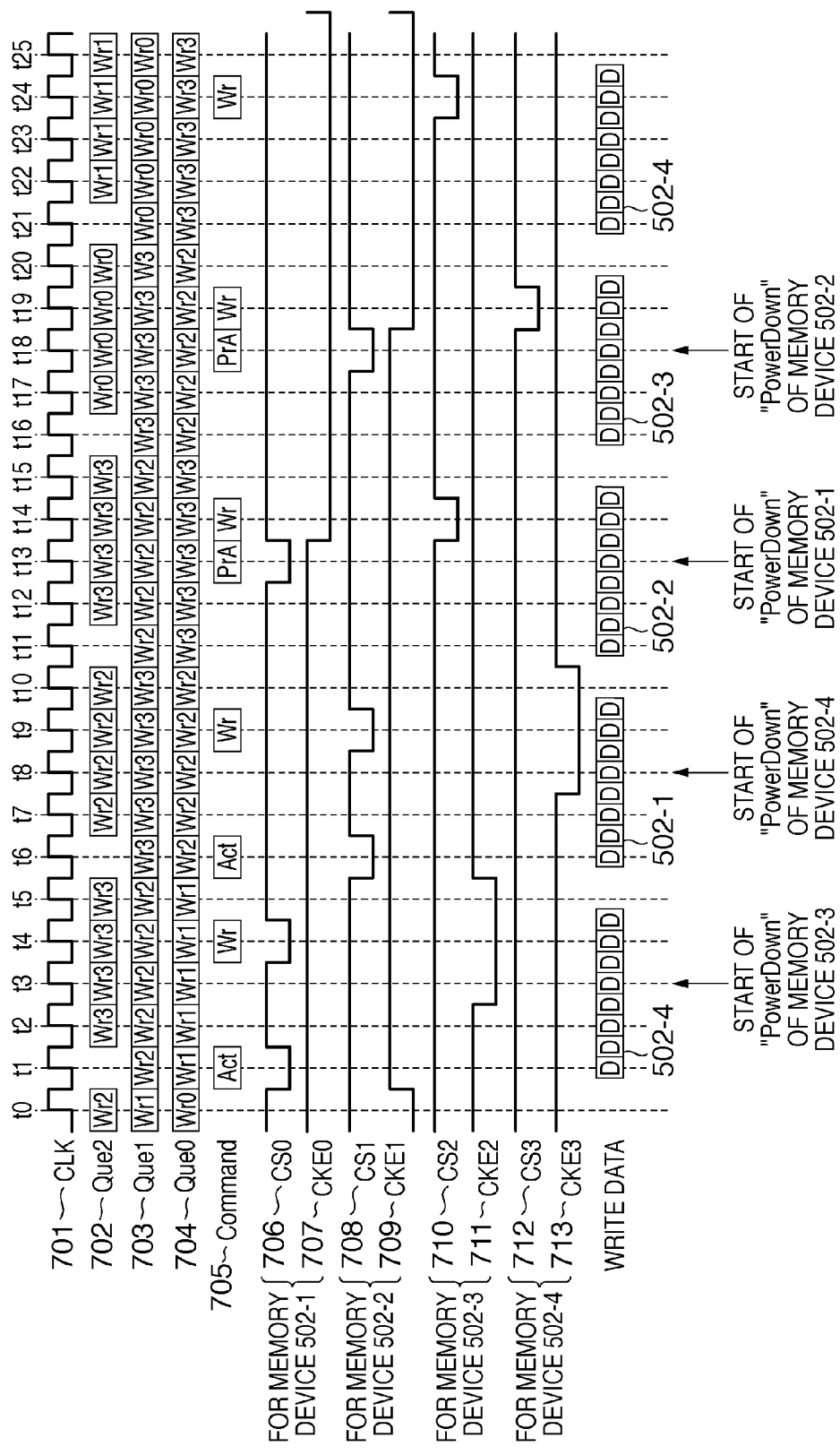
FIG. 11 is a timing chart showing an example of the operation of the memory control circuit 100.

FIG. 11 is a timing chart showing an example of the operation of a memory control circuit 100 including an access management unit which executes the output control processing shown in FIG. 10.

Referring to FIG. 11, a queue buffer unit 103 includes queue 0 (1104), queue 1 (1103), and queue 2 (1102), and can hold three access commands. Assume that all kinds of write processing are 8-beat one-shot processing.

As shown in FIG. 11, the command generating unit 107 issues an activate command (ACT) at a trailing edge timing t0 to open a designated bank address and row address in a memory device 502-1. When a time corresponding to a predetermined number of clocks (the number of clocks defined by CL) has elapsed (at a trailing edge timing t3), the command generating unit 107 issues the write command Wr to the memory device 502-1, and the data interface unit 108 starts write processing for the memory device 502-1 at a trailing edge timing t5. When the write processing of write data in the memory device 502-1 is complete at a trailing edge timing t9, the memory control circuit 100 determines whether the queue buffer unit 103 holds an access command to be issued to the memory device 502-1 at a trailing edge timing t12 after the elapse of a time corresponding to a predetermined number of clocks (the number of clocks defined by tWR).

At the trailing edge timing t12, the queue buffer unit 103 only holds an access commands Wr2 and Wr3 to be issued to memory devices 502-3 and 502-4, but does not hold the access command Wr1 to be issued to the memory device 502-1. Therefore, the command generating unit 107 issues a precharge all command PrA at the trailing edge timing t12.

When the memory device 502-1 accepts the precharge all command from the command generating unit 107, the access management unit 106 instructs the CKE driving unit 109 to set the CKE0 signal to Low at a trailing edge timing t13. As a result, the CKE driving unit 109 outputs Low as the CKE0 signal to cause the memory device 502-1 to start "precharge PowerDown" and shift to the low power consumption mode.

Likewise, the command generating unit 107 issues an activate command (ACT) at the trailing edge timing t5 to open a designated bank address and row address in a memory device 502-2. When a time corresponding to a predetermined number of clocks (the number of clocks defined by CL) has elapsed (at a trailing edge timing t8), the command generating unit 107 issues the write command Wr to the memory device 502-2, and the data interface unit 108 starts the write processing of write data in the memory device 502-2 at a trailing edge timing t10. When the write processing of write data in the memory device 502-2 is complete at a trailing edge timing t14, the access management unit 106 determines whether the queue buffer unit 103 holds an access command to be issued to the memory device 502-2 at a trailing edge timing t17.

At the trailing edge timing t17, the queue buffer unit 103 only holds access commands Wr0, Wr2, and Wr4 to be issued to the memory devices 502-1, 502-3, and 502-4, but does not hold the access command Wr1 to be issued to the memory device 502-2. Therefore, the command generating unit 107 issues the precharge all command PrA at the trailing edge timing t17.

When the memory device 502-2 accepts the precharge all command from the command generating unit 107, the access management unit 106 instructs the CKE driving unit 109 to set the CKE1 signal to Low at the trailing edge timing t17. As a result, the CKE driving unit 109 outputs Low as the CKE1 signal to cause the memory device 502-2 to start "precharge PowerDown" and shift to the low power consumption mode.

When the command generating unit 107 issues the write command Wr to the memory device 502-3 at the trailing edge timing t13, the data interface unit 108 starts write processing for the memory device 502-3 at the trailing edge timing t15. When a time corresponding to a predetermined number of clocks has elapsed (for example, at a trailing edge t22) after the completion of the write processing of write data in the memory device 502-3 at a trailing edge timing t19, the access management unit 106 determines whether the queue buffer unit 103 holds any access command to be issued to the memory device 502-3 or a command selection unit 105 has selected any access command to be issued to the memory device 502-3.

Since the command selection unit 105 has selected the access command to be issued to the memory device 502-3 at the trailing edge timing t22, the access management unit 106 determines that the time until the issuance of the next write command is less than a predetermined value. In this case, the access management unit 106 keeps the CKE2 signal at High and does not instruct the CKE driving unit 109 to set the CKE2 signal to Low.

As is obvious from the above description, upon determining that the queue buffer unit 103 does not hold any access command to be issued to a determination target memory device, the memory control circuit 100 according to this exemplary embodiment sets the CKE signal to Low upon issuing a precharge all command to the memory device, and executes "precharge PowerDown". On the other hand, upon determining that the queue buffer unit 103 holds an access code to be issued to a determination target memory device and that the time until the issuance of the access command is equal to or more than a predetermined time, the memory control circuit 100 sets the CKE signal to Low to execute "active PowerDown".

If the memory control circuit 100 determines that the queue buffer unit 103 holds an access command to be issued to a determination target memory device and the time until the issuance of the access command is less than a predetermined value, the memory control circuit 100 does not set the CKE signal to Low and executes no "PowerDown".

In this manner, it is possible to improve the access efficiency of memory devices and reduce the power consumption by choosing between shifting to "precharge PowerDown", shifting to "active PowerDown", and not shifting "PowerDown" in accordance with the state inside the queue buffer unit 103.

The above exemplary embodiment is configured to compare with a preset value to determine whether to execute "active PowerDown". However, the present invention is not limited to this, and the value for comparison can be arbitrarily changed. The third exemplary embodiment is configured to calculate a clock cycle until the issuance of an access command by referring to all the access commands held in the queue buffer unit 103. However, the present invention is not limited to this, and the range of access commands to be referred to can be arbitrarily changed.

<1. Arrangement of Memory Control Circuit>

Figure 12:
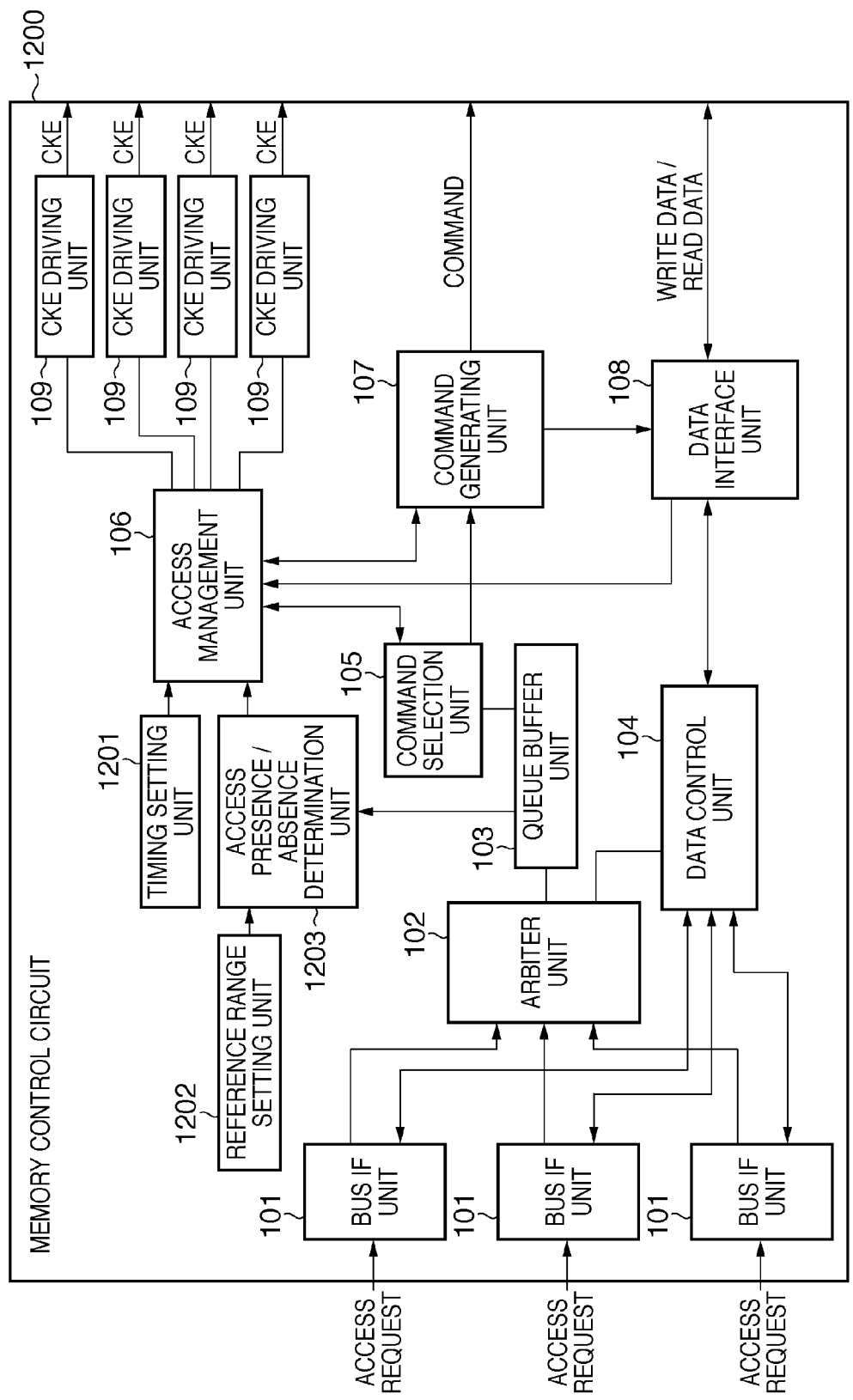
FIG. 12 is a block diagram showing the arrangement of a memory control circuit 1200 according to still another exemplary embodiment of the present invention.

FIG. 12 is a block diagram showing the arrangement of a memory control circuit (control apparatus) 1200 according to the present invention. Note that in this case, the differences between the memory control circuit 1200 and a memory control circuit 100 shown in FIG. 1 will be mainly described below.

Referring to FIG. 12, reference numeral 1201 denotes a timing setting unit to set a predetermined value used for comparison when determining whether to execute "active PowerDown". Upon calculating a clock cycle until the issuance of the next access command, an access management unit 106 compares the predetermined value set via the timing setting unit 1201 with the calculated clock cycle to determine whether to execute "active PowerDown".

Reference numeral 1202 denotes a reference range setting unit to designate an effective range to be referred to by referring to access commands in number equal to or more than the number required when the number of queues of a queue buffer unit 103 increases, in order to prevent a situation incapable of shifting to the low power consumption state.

Reference numeral 1203 denotes an access presence/absence determination unit to determine whether an access command to be issued to a determination target memory device is held in the queue buffer unit 103, by referring to access commands in the effective range designated by the reference range setting unit 1202.

Note that the memory control circuit 1200 according to this exemplary embodiment is configured to determine the presence/absence of an access command to be issued to a determination target memory device by referring to access commands in the effective range designated by the reference range setting unit 1202 for the following reason.

In general, the only penalty to the performance of each memory device when it has shifted to the "precharge PowerDown" state or to the "active PowerDown" state is that it is necessary to issue an activate command first when issuing an access command because all the banks are closed.

The latest DDR3 memory device is additionally provided with a new low power consumption mode which can obtain a larger power saving effect at the cost of the possibility of a penalty to the performance.

According to a data book about the DDR3 memory device, a memory device in the "precharge PowerDown" mode requires at least 10 to 20 clock cycles depending on the speed of the memory device to return from the low power consumption mode.

Assume that the number of queues of the queue buffer unit 103 is three, and each access command has a length of eight beats (four clocks). In this case, the time margin before the issuance of an access command is only a time corresponding to about 12 clocks or more, which is not sufficient for this queue buffer unit to be applied to the fastest DDR3-1600 memory device.

If, however, the queue buffer unit is optimized to be applied to the DDR3-1600 memory device, a system including memory devices equivalent to the DDR3-800 refers to access commands in an unnecessary range in spite of the fact that each memory can shift to the "precharge PowerDown" state. This may lead to a failure to obtain a sufficient power saving effect. In order to avoid such a situation, the memory control circuit 1200 according to this exemplary embodiment is configured to designate an effective range to which the reference range setting unit 1202 should refer.

<2. Concrete Arrangement of Access Presence/Absence Determination Unit 1203>

Figure 13:
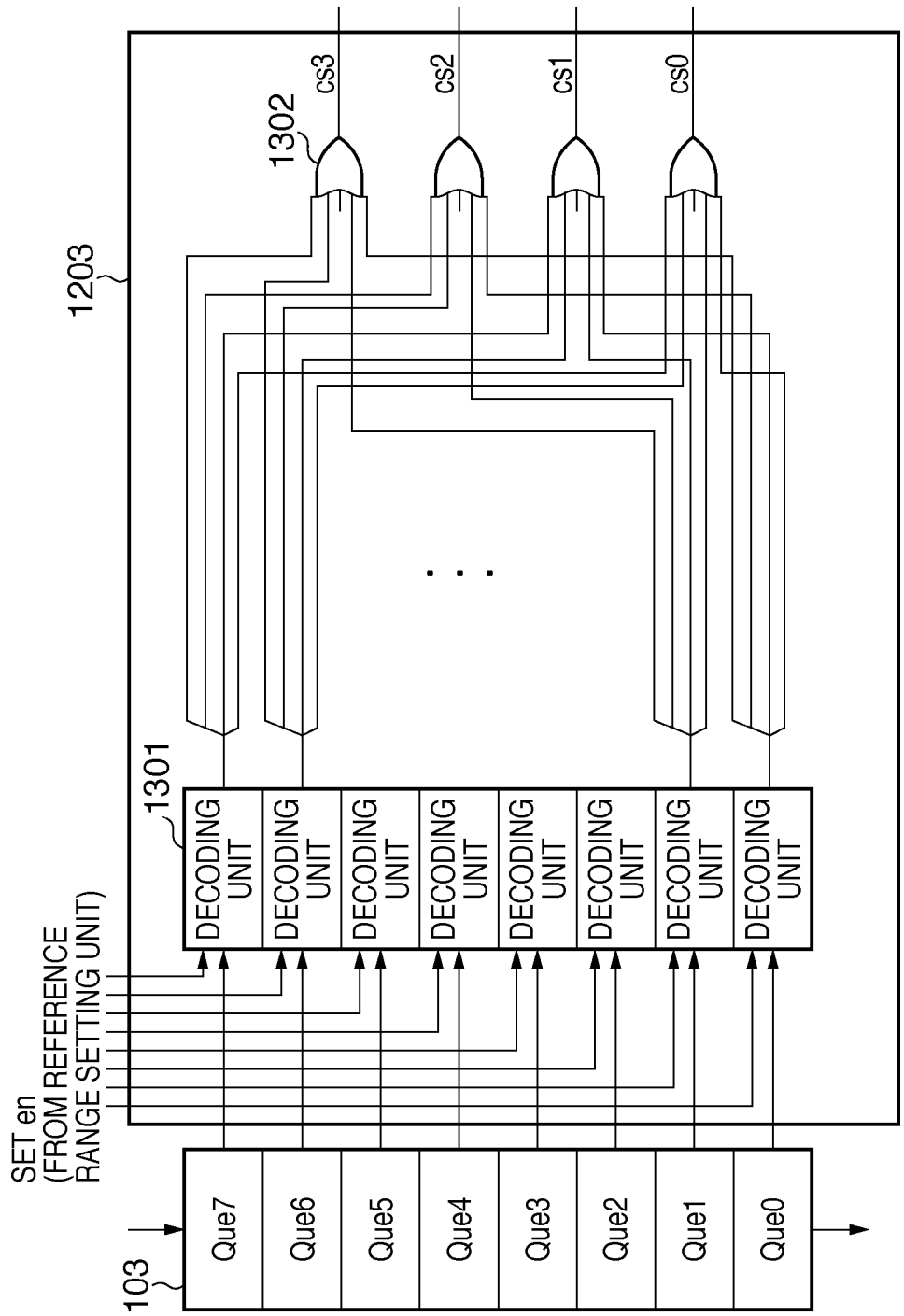
FIG. 13 is a view showing the arrangement of an access presence/absence determination unit 1203 of the memory control circuit 1200.

FIG. 13 is a view showing the concrete arrangement of the access presence/absence determination unit 1203. Referring to FIG. 13, reference numeral 1301 denotes decoding units respectively connected to eight queues Que0 to Que7 of the queue buffer unit 103 to determine whether access commands are held in the respective queues or not (empty), and if an access command is held, discriminates to which memory device the held access command is to be issued. Note that the decoding units 1301 are also connected to the reference range setting unit 1202 to determine whether each queue of the queue buffer unit 103 is regarded as falling within the reference range or not (en).

Reference numeral 1302 denotes OR circuits which output the logical ORs of outputs from the decoding units 1301. If an access command to be issued to a given memory device exists in the reference range, the output of the OR circuit corresponding to the memory device is set to High.

Figures 14, 15:
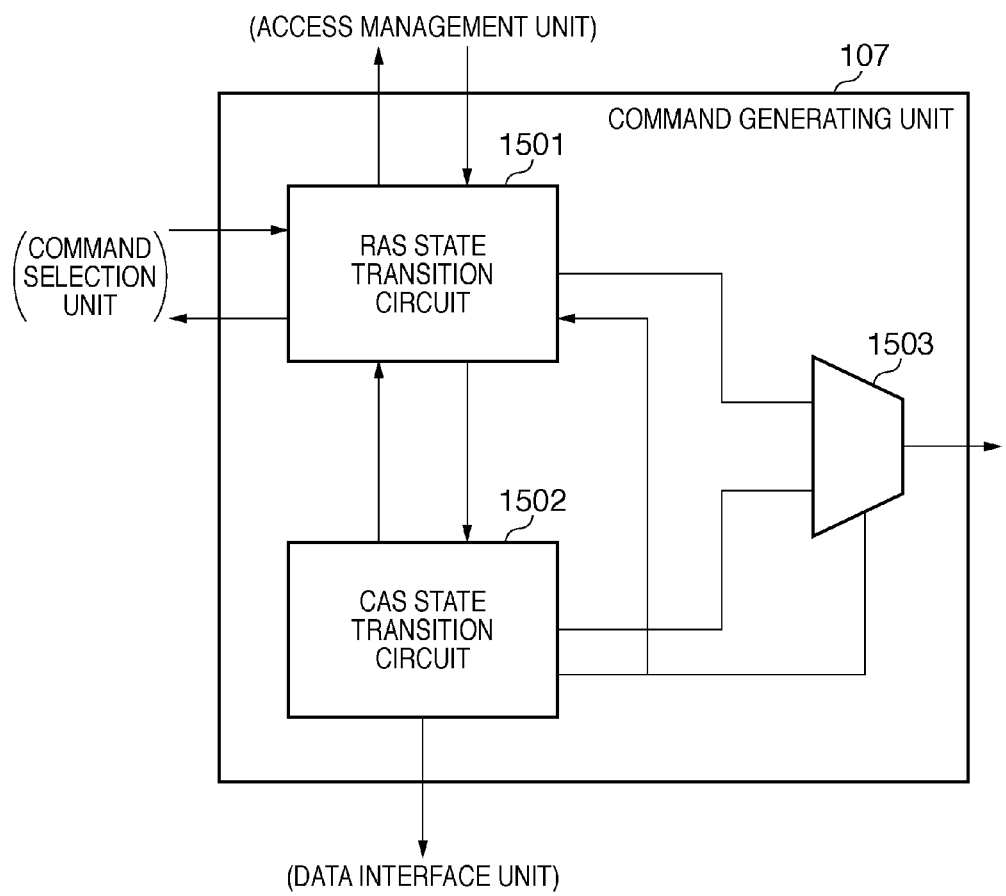
FIG. 14 is a view showing an output example from the access presence/absence determination unit 1203 of the memory control circuit 1200.
FIG. 15 is a view showing the arrangement of a command generating unit 107 of the memory control circuit 1200.

FIG. 14 shows the correspondence relationship between the determination results obtained by the decoding units 1301 and outputs from the OR circuits corresponding to the respective memory devices.

As is obvious from the above description, this exemplary embodiment is configured to arbitrarily change a value for comparison in determining whether to execute "active PowerDown". The exemplary embodiment is further configured to arbitrarily change access commands, of the access commands held in the queue buffer unit 103, which are to be referred to. This makes it possible to perform control in accordance with the specifications of memory devices.

In the above exemplary embodiment, the access management unit 106 monitors the queue buffer unit 103 and determines, based on the monitoring result, whether to shift each memory device to the "PowerDown" state. However, the present invention is not limited to this, and may determine, based on how access commands are issued by a command generating unit 107, whether each memory device is to be shifted to the "PowerDown" state.

<1. Concrete Arrangement of Command Generating Unit 107>

The concrete arrangement of a command generating unit 107 will be described first. FIG. 15 shows the concrete arrangement of the command generating unit 107. Referring to FIG. 15, reference numeral 1501 denotes a RAS state transition circuit which issues a precharge command and activate command to a target memory device in accordance with the selection result obtained by a command selection unit 105; 1502, a CAS state transition circuit which issues an access command to a memory device which is made ready for read or write operation by the RAS state transition circuit 1501; and 1503, a selection circuit 1503 which selects which one of the commands output from the RAS state transition circuit 1501 and the CAS state transition circuit 1502 is supplied to an actual memory device. In the case of FIG. 15, priority is given to a CAS state transition circuit output.

<2. Example of Operation of Memory Control Circuit 100>

Figure 16:
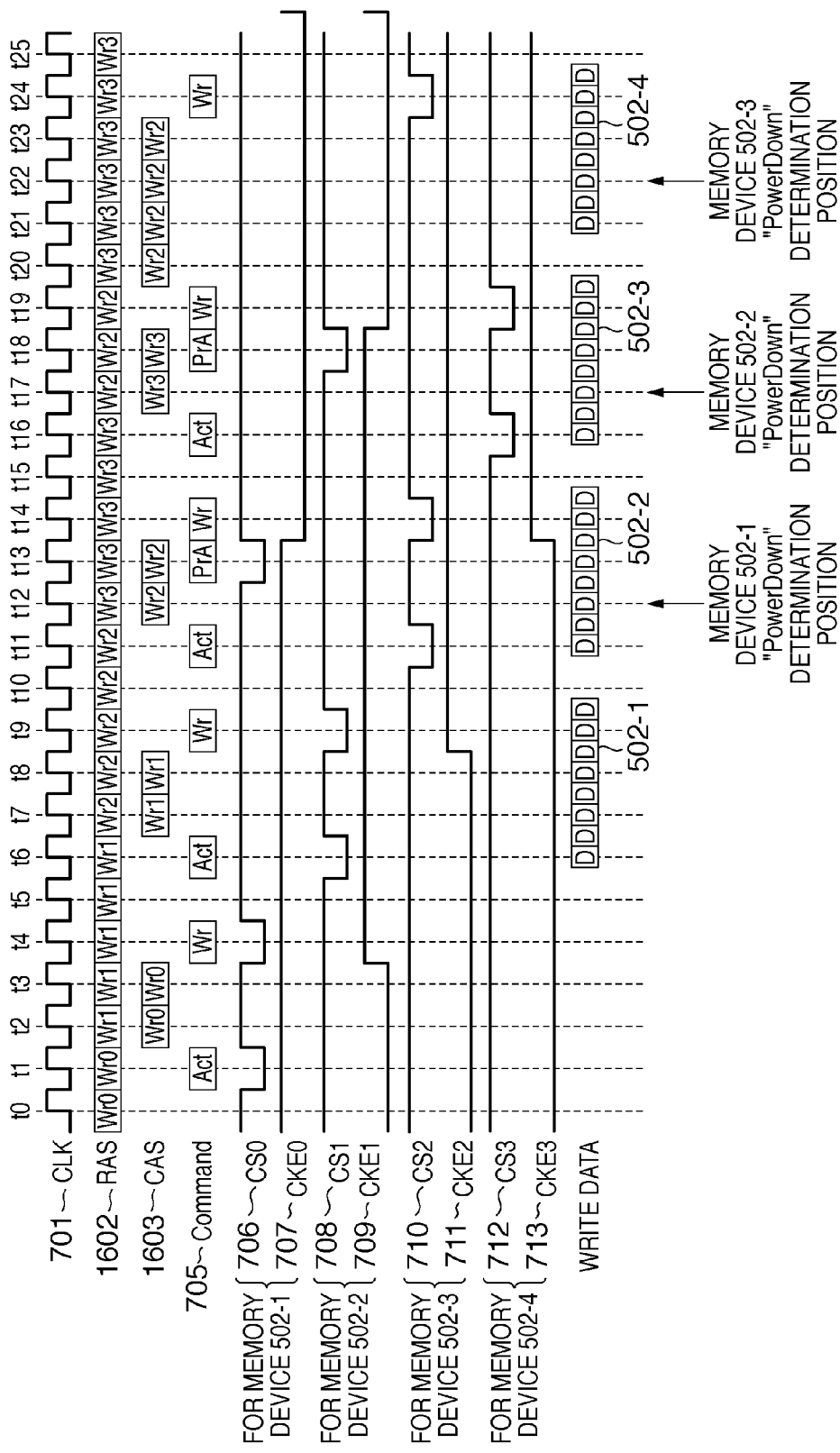
FIG. 16 is a timing chart showing an example of the operation of the memory control circuit 1200.
Figure 18:
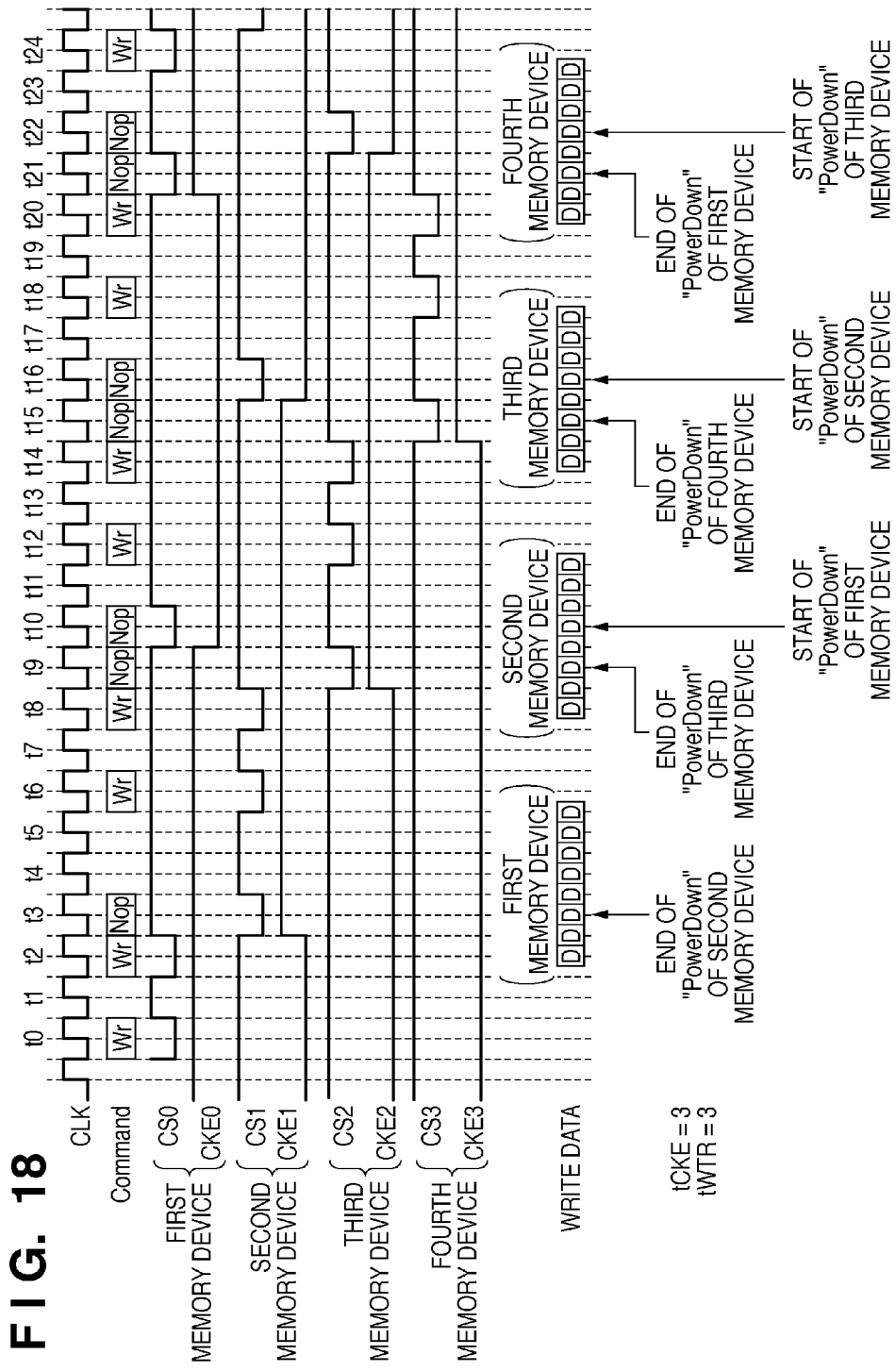
FIG. 18 is a timing chart showing an example of the operation of each memory device when each memory device performs low power consumption mode/normal mode switching on a semiconductor chip on which four memory devices are mounted.

FIG. 16 is a timing chart showing an example of the operation of a memory control circuit 1200.

Upon receiving a signal permitting access to a determination target memory device from an access management unit 106 at a timing t0, the RAS state transition circuit 1501 issues an ACT command under the condition of receiving a permission signal from the CAS state transition circuit 1502. At a timing t1, a write command Wr0 is transmitted to the CAS state transition circuit 1502 and issued at a timing t3.

Upon issuing the write command Wr at the trailing edge timing t3, a memory control circuit 100 executes the write processing of write data in a memory device 502-1 at a trailing edge timing t5.

When the memory control circuit 100 transmits the write command Wr0 to the CAS state transition circuit 1502 at the trailing edge timing t1, a queue buffer unit 103 transmits, to the RAS state transition circuit 1501, the write command Wr1 to be issued to a memory device 502-2.

When the RAS state transition circuit 1501 receives the write command Wr1 to be issued to the memory device 502-2, the access management unit 106 instructs a CKE driving unit 109 to set the CKE1 signal at High at the timing at which the CAS state transition circuit 1502 issues the previous write command Wr0 (at the trailing edge timing t3).

Upon completion of issuance of the write command Wr issued by the CAS state transition circuit 1502 at the trailing edge timing t3, the RAS state transition circuit 1501 issues an ACT command to the memory device 502-2 at the next timing (the trailing edge timing t5). At a timing t6, the RAS state transition circuit 1501 transmits the write command Wr1 to the CAS state transition circuit 1502 at the timing t6. With this operation, the memory control circuit 100 issues the write command Wr to the memory device 502-2 at a trailing edge timing t8.

Upon issuing the write command Wr at the trailing edge timing t8, the memory control circuit 100 executes the write processing of write data in the memory device 502-2 at a trailing edge timing t10.

Likewise, every time the RAS state transition circuit 1501 transmits a write command to the CAS state transition circuit 1502, the RAS state transition circuit 1501 receives the next write command from the queue buffer unit 103. At the timing at which the CAS state transition circuit 1502 issues a write command, the access management unit 106 issues an instruction to set the CKE signal at High for a memory device to which the next write command is to be issued. Upon completion of issuance of a write command by the CAS state transition circuit 1502, the RAS state transition circuit 1501 issues an ACT command to the memory device to which the next write command is to be issued.

When the write processing of write data in the memory device 502-1 is complete at a trailing edge timing t9, the access management unit 106 determines whether to make the memory device 502-1 shift to "PowerDown" at a leading edge timing t12.

At the leading edge timing t12, the RAS state transition circuit 1501 holds only a write command Wr3 to be issued to a memory device 502-4, and the CAS state transition circuit 1502 holds only a write command Wr2 to be issued to a memory device 502-3. The access management unit 106 therefore instructs the RAS state transition circuit 1501 to issue a precharge all command. The RAS state transition circuit 1501 then issues a precharge all command to the memory device 502-1 at the trailing edge timing t12.

Likewise, when the write processing of write data in the memory device 502-2 is complete at a trailing edge timing t14, the access management unit 106 determines whether to make the memory device 502-2 shift to "PowerDown" at a leading edge timing t17.

At the leading edge timing t17, the RAS state transition circuit 1501 holds only the write command Wr2 to be issued to the memory device 502-3, and the CAS state transition circuit 1502 holds only the write command Wr3 to be issued to the memory device 502-4. The access management unit 106 therefore instructs the RAS state transition circuit 1501 to issue a precharge all command. The RAS state transition circuit 1501 then issues a precharge all command to the memory device 502-2 at the trailing edge timing t17.

Subsequently, likewise, every time the write processing of write data in a memory device is complete, the access management unit 106 determines, based on the write commands held in the RAS state transition circuit 1501 and the CAS state transition circuit 1502, whether it is possible to make a determination target memory device shift to "PowerDown". Upon determining that it is possible to make the memory device shift to "PowerDown", the access management unit 106 instructs the RAS state transition circuit 1501 to issue a precharge all command.

As is obvious from the above description, in the memory control circuit 1200 according to this exemplary embodiment, the access management unit 106 monitors the command generating unit 107, and performs control, based on the monitoring result, to make each memory device shift to the "PowerDown" state and return from the "PowerDown" state.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-145821 filed on Jun. 18, 2009, No. 2009-138339 filed on Jun. 9, 2009, and No. 2009-150175 filed on Jun. 24, 2009, which are hereby incorporated by reference herein in their entirety.

What is claimed is:

1. A control apparatus which is connected to a plurality of memory devices and which controls operation of the plurality of memory devices based on an access request, the apparatus comprising:
a queue buffer configured to hold a plurality of access requests;
a setting unit configured to set a referring range of the plurality of access requests held in the queue buffer based on a power state of a target memory device;
an issuing unit configured to issue a command in accordance with an access request selected from a plurality of access requests held in said queue buffer;
a management unit configured to activate the target memory device, of the plurality of memory devices, which is a target for the access request selected from the plurality of access requests held in the referring range of said queue buffer; and
a processing unit configured to execute memory access for the target memory device based on the access request, and to activate or inactivate the power state of at least one of the plurality of memory devices other than the target memory device at the same clock cycle of the memory access for the target memory device based on the access request.

2. The apparatus according to claim 1, wherein said issuing unit issues a precharge all command to the activated target memory device when said queue buffer holds no access request targeted to the activated target memory device, and
said management unit stops a clock enable signal for a memory device to which a precharge all command has been issued.

3. The apparatus according to claim 1, wherein said management unit continues to output a clock enable signal to an activated memory device, and stops a clock enable signal to an inactivated memory device.

4. The apparatus according to claim 2, wherein when an access request held in said queue buffer is an access request targeted to an activated memory device, said management unit calculates a time required to issue a command in accordance with the access request targeted to the activated memory device, stops a clock enable signal for the activated memory device to which the access request is targeted, when the calculated time is not less than a predetermined time, and continues to output a clock enable signal for the activated memory device to which the access request is targeted, when the calculated time is less than the predetermined time.

5. The apparatus according to claim 2, further comprising a range designation unit configured to designate a range of said queue buffer which is to be referred to when said management unit determines whether the access request targeted to the activated target memory device is held in said queue buffer.

6. The apparatus according to claim 4, further comprising a time setting unit configured to set the predetermined time.

7. The apparatus according to claim 1, wherein when the target memory device to which the command corresponding to the access request is issued is in a close page mode, said issuing unit issues the command corresponding to the access request to the target memory device after an activate command is issued.

8. The apparatus according to claim 1, wherein when processing to be executed based on the access request is read processing, said management unit inactivates the target memory device for which the read processing has been executed, upon determining that said processing unit has executed the read processing.

9. The apparatus according to claim 1, wherein when processing to be executed based on the access request is write processing, said management unit inactivates the target memory device for which the write processing has been executed, upon determining that said processing unit has executed the write processing, if a time unique to the target memory device for which the write processing has been executed has elapsed.

10. The apparatus according to claim 1, further comprising a plurality of clock enable (CKE) driving units corresponding to each of the memory devices,
wherein the access request includes a chip select signal indicating a memory device as the target for the access request, and
said management unit individually activates or inactivates a memory device indicated by the chip select signal by controlling a corresponding CKE driving unit.

11. A control apparatus comprising:
a plurality of driving units configured to control a plurality of memory devices;
a queue buffer configured to hold a plurality of access requests; and
a setting unit configured to set a referring range of the plurality of access requests held in the queue buffer based on a power state of a target memory device; and
a management unit configured to control a driving unit so as to make the memory device shift to different power saving states in accordance with a type of access request held in the referring range of the plurality of access requests held in said queue buffer while accessing to one of the plurality of memory devices based on an access request stored in a head of the queue buffer.

12. The apparatus according to claim 11, wherein said management unit controls said driving unit so as to make a memory device to be inactivated shift to "active PowerDown" when said queue buffer holds an access request to the memory device to be inactivated.

13. The apparatus according to claim 11, wherein if said queue buffer holds no access request to a memory device to be inactivated, said management unit controls said driving unit so as to make the memory device to be inactivated shift to "precharge PowerDown".

14. The apparatus according to claim 11, wherein if said queue buffer holds an access request to a memory device to be inactivated, said management unit controls said driving unit so as not to inactivate the memory device to be inactivated.

15. The apparatus according to claim 1, wherein when determining that said processing unit has executed the processing to be executed based on the access request, said management unit inactivates the target memory device for which the processing to be executed has been executed based on the access request.

16. The apparatus according to claim 1, wherein the memory device includes DRAM.

* * * * *